United States Patent
Nakhjavani et al.

(10) Patent No.: US 10,018,151 B2
(45) Date of Patent: *Jul. 10, 2018

(54) METHODS AND APPARATUS TO VARY REVERSE THRUST OF AIRCRAFT ENGINES

(71) Applicant: The Boeing Company, Chicago, IL (US)

(72) Inventors: Omid B. Nakhjavani, Kirkland, WA (US); Anthony K. Gilbert, Tacoma, WA (US); Andrew Na, Tacoma, WA (US); Mohammad A. Heidari, Bellevue, WA (US)

(73) Assignee: The Boeing Company, Chicago, IL (US)

(*) Notice: Subject to any disclaimer, the term of this patent is extended or adjusted under 35 U.S.C. 154(b) by 551 days.

This patent is subject to a terminal disclaimer.

(21) Appl. No.: 14/596,969

(22) Filed: Jan. 14, 2015

(65) Prior Publication Data

US 2016/0201601 A1    Jul. 14, 2016

(51) Int. Cl.
*F02K 1/72*    (2006.01)
*F02K 1/76*    (2006.01)

(52) U.S. Cl.
CPC .............. *F02K 1/72* (2013.01); *F02K 1/763* (2013.01)

(58) Field of Classification Search
CPC .................................. F02K 1/72; F02K 1/763
USPC ......................................................... 60/204
See application file for complete search history.

(56) References Cited

U.S. PATENT DOCUMENTS

| | | | |
|---|---|---|---|
| 2,936,969 A | | 5/1960 | Griffith et al. |
| 3,248,878 A | * | 5/1966 | Clark .................. B64C 29/0025 239/265.25 |
| 3,330,505 A | * | 7/1967 | Sedlmaier ................. F02K 1/58 244/110 B |
| 3,500,646 A | * | 3/1970 | Hom ........................ F02K 1/72 239/265.29 |

(Continued)

FOREIGN PATENT DOCUMENTS

| | | |
|---|---|---|
| EP | 0809011 A2 | 11/1997 |
| EP | 1286037 A1 | 2/2003 |

(Continued)

OTHER PUBLICATIONS

European Patent Office, "Extended European search report," issued in connection with European patent application No. 15197632.1, dated Jun. 10, 2016, 6 pages.

(Continued)

*Primary Examiner* — Jason Newton
(74) *Attorney, Agent, or Firm* — Hanley, Flight & Zimmerman, LLC

(57) ABSTRACT

Methods and apparatus to vary reverse thrust of aircraft engines are disclosed. An example cascade apparatus disclosed herein includes a cascade frame having a first end, a second end, and a fixed structure extending between the first end and second end, where the cascade frame defines a slot. A cascade forms a reverse thrust flow path and at least a portion of the cascade is slidably coupled to the frame via the slot. The cascade slides relative the frame between a first position to produce a first reverse thrust and a second position to produce a second reverse thrust, where the first reverse thrust is different than the second reverse thrust.

22 Claims, 16 Drawing Sheets

(56) References Cited

U.S. PATENT DOCUMENTS

| | | | |
|---|---|---|---|
| 3,638,884 A | 2/1972 | Timperman | |
| 3,655,150 A * | 4/1972 | Haberkorn | B64C 9/38 |
| | | | 239/265.31 |
| 3,779,010 A * | 12/1973 | Chamay | F02K 1/09 |
| | | | 239/265.31 |
| 3,829,020 A * | 8/1974 | Stearns | F02K 1/09 |
| | | | 181/216 |
| 3,831,376 A | 8/1974 | Moorehead | |
| 3,981,451 A * | 9/1976 | Prior | F02K 1/72 |
| | | | 239/265.31 |
| 4,026,105 A * | 5/1977 | James | F02K 1/64 |
| | | | 239/265.29 |
| 4,030,290 A * | 6/1977 | Stachowiak | F02K 1/64 |
| | | | 239/265.27 |
| 4,145,877 A * | 3/1979 | Montgomery | F02K 1/72 |
| | | | 60/226.2 |
| 4,183,478 A * | 1/1980 | Rudolph | F02K 1/60 |
| | | | 239/265.29 |
| 4,227,458 A | 10/1980 | Kapoor | |
| 4,527,391 A * | 7/1985 | Marx | F02K 1/72 |
| | | | 239/265.29 |
| 4,690,329 A | 9/1987 | Madden | |
| 4,760,960 A * | 8/1988 | Ward | F02K 1/002 |
| | | | 239/265.25 |
| 4,798,328 A | 1/1989 | Thayer et al. | |
| 4,823,547 A * | 4/1989 | Newton | F02K 1/72 |
| | | | 239/265.31 |
| 4,828,173 A | 5/1989 | Guerty | |
| 5,209,057 A * | 5/1993 | Remlaoui | F02K 1/70 |
| | | | 239/265.29 |
| 5,706,649 A | 1/1998 | Robinson et al. | |
| 5,904,690 A | 5/1999 | Middleman et al. | |
| 5,987,880 A * | 11/1999 | Culbertson | F02K 1/70 |
| | | | 239/265.37 |
| 6,036,142 A * | 3/2000 | Yates | B64C 15/02 |
| | | | 239/265.19 |
| 6,256,980 B1 * | 7/2001 | Lecordix | F02K 1/72 |
| | | | 239/265.29 |
| 6,269,642 B1 | 8/2001 | Arnold et al. | |
| 6,382,559 B1 | 5/2002 | Sutterfield et al. | |
| 6,434,927 B1 * | 8/2002 | Stretton | F02K 1/72 |
| | | | 239/265.31 |
| 7,836,681 B2 | 11/2010 | Pesyna et al. | |
| 9,874,176 B2 * | 1/2018 | Nakhjavani | F02K 1/76 |
| 2005/0086927 A1 | 4/2005 | Lair et al. | |
| 2006/0005530 A1 | 1/2006 | Blin et al. | |
| 2011/0284660 A1 | 11/2011 | Vauchel et al. | |
| 2014/0027536 A1 | 1/2014 | Gormley | |
| 2016/0025037 A1 | 1/2016 | Teia Dos Santos | |
| 2016/0201602 A1 | 7/2016 | Nakhjavani | |

FOREIGN PATENT DOCUMENTS

| | | |
|---|---|---|
| FR | 3006716 | 12/2014 |
| GB | 1504652 | 3/1978 |

OTHER PUBLICATIONS

European Patent Office, "Extended European search report," issued in connection with European patent application No. 15197634.7, dated Jun. 10, 2016, 5 pages.

United States Patent and Trademark Office, "Notice of Allowance," issued in connection with U.S. Appl. No. 14/596,964, dated Sep. 8, 2017, 33 pages.

Robert L. Norton, "Design of Machinery," Second Edition, McGraw-Hill Inc., 1999, pp. 54-83, 34 pages.

United States Patent and Trademark Office, "Non-Final Office Action," issued in connection with U.S. Appl. No. 14/596,964, dated May 4, 2017, 45 pages.

* cited by examiner

METHODS AND APPARATUS TO VARY
REVERSE THRUST OF AIRCRAFT ENGINES

FIELD OF THE DISCLOSURE

This patent relates generally to aircraft engines and, more particularly, to methods and apparatus to vary reverse thrust of aircraft engines.

BACKGROUND

Aircraft turbofan engines often employ reverse thruster systems to produce a reverse thrust to help decelerate the aircraft upon landing (e.g., after touchdown), thereby reducing brake wear and enabling shorter landing distances. For example, reverse thruster systems may be deployed upon landing to provide additional stopping forces in adverse weather conditions (e.g., on wet, slushy or slippery runways). To produce reverse thrust and/or reduce forward thrust, many known reverse thruster systems of turbofan engines include a cascade system to redirect or spoil airflow (e.g., provided by a fan of the turbofan engine) that would otherwise produce a forward thrust.

Although the reverse thruster systems provided by cascade systems typically reduce a net forward thrust produced by an aircraft engine, the reverse thrust produced by known cascade systems do not overcome a forward thrust produced by a main engine core. Thus, the net thrust produced by the aircraft engine results in a forward thrust even when the reverse thruster system is deployed and the aircraft is parked at, for example, a tarmac. As a result, most aircraft engines employing a cascade system type reverse thruster system are not capable of providing a net reverse thrust to cause an aircraft to travel in a reverse direction when, for example, the aircraft is parked. To this end, a pushback or a tow tractor is needed to move (i.e., push or pull) the commercial aircraft employing turbofan engines in a reverse direction when departing from, for example, a terminal gate, a tarmac, etc.

SUMMARY

An example cascade apparatus includes a cascade frame having a first end, a second end, and a fixed structure extending between the first end and second end, where the cascade frame defines a slot. A cascade forms a reverse thrust flow path and at least a portion of the cascade is slidably coupled to the frame via the slot. The cascade slides relative to the frame between a first position to produce a first reverse thrust and a second position to produce a second reverse thrust, where the first reverse thrust is different than the second reverse thrust.

An example method to control reverse thrust of an aircraft engine includes varying a position of a cascade relative to a position of a frame by sliding the cascade relative to the frame to vary a reverse thrust provided by a reverse thrust flow path defined by the cascade, the reverse thrust being proportional to a position of the cascade relative to the frame.

In another example, a cascade apparatus for use with an aircraft engine includes means for directing fluid flow to provide a reverse thrust and means for supporting the means for directing fluid flow, where the means for supporting has means for slidably receiving the means for directing fluid flow to enable the means for directing fluid flow to move relative to the means for supporting between a first position and a second position. The means for directing fluid flow to provide a first reverse thrust in the first position and second reverse thrust in the second position, where the first reverse thrust is different than the second reverse thrust.

Figure 1:
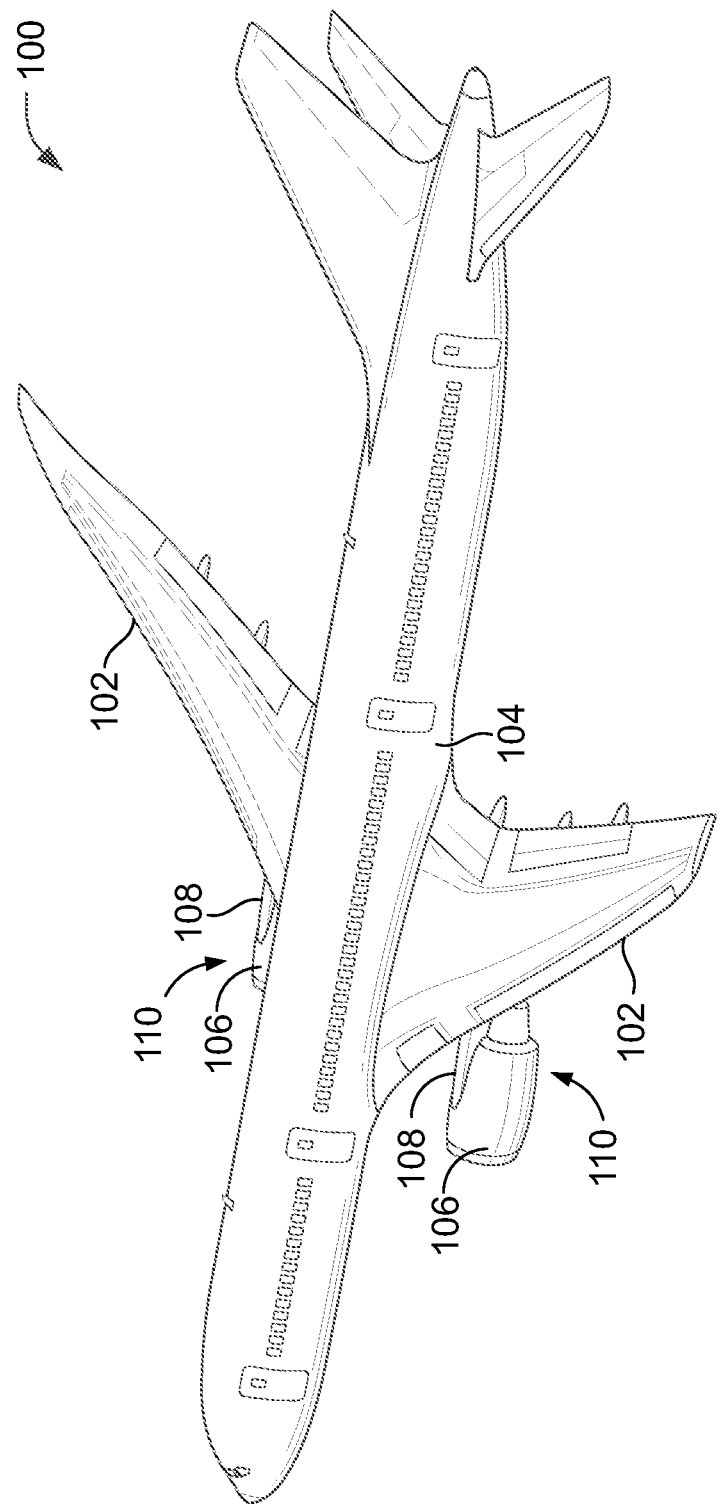
FIG. 1 depicts an example aircraft having an aircraft engine constructed in accordance with the teachings disclosed herein.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in direct contact with another part means that there is no intermediate part between the two parts.

DETAILED DESCRIPTION

Many known turbofan engines employ reverse thrust mechanisms to decelerate an aircraft upon landing. The reverse thrust produced reduces the forward thrust produced by the turbofan engine and, thus, reduces the speed of the aircraft. In some examples, reverse thrust is produced by redirecting airflow within the engine that would otherwise produce forward thrust. For example, airflow that would otherwise be ejected from a rear of the engine to produce forward thrust is redirected to exit the engine in a circumferentially outward and/or generally forward direction via a cascade system. In some examples, a door is disposed in the engine to redirect the airflow through the engine toward the reverse thrust mechanism. However, known cascade systems of known reverse thruster systems divert all or none of the thrust. As a result, reverse thrust is not used to move a commercial aircraft rearward from a standing or stationary position.

The example reverse thruster systems disclosed herein vary, adjust and/or control of an amount of reverse thrust produced by an engine of an aircraft. More specifically, the example reverse thruster systems disclosed herein allow a degree of reverse thrust to be accurately controlled and/or varied (e.g., by an operator or a control system) to provide precise control that may allow for braking and/or reverse motion of an aircraft from a stationary position. For example, the example reverse thrust systems disclosed herein can help bring an aircraft to a stationary position upon landing to reduce an amount of braking. In some examples, when an aircraft is in a stationary position (e.g., a parked position) or a substantially stationary position (e.g., rolling at relatively low speed such as, for example, 1 mph), the example reverse thrust systems disclosed herein can be used to propel or move the aircraft in a rearward direction. In this manner, the example reverse thrust systems disclosed herein enable an aircraft to move in a reverse or rearward direction when, for example, the aircraft is initially parked at a tarmac, an apron, a hanger, etc. In some examples, the example reverse thrust systems disclosed herein may be employed to alter and/or vary a net thrust of each engine (and/or a first zone of a cascade system) independently from another one of the engines (and/or a second zone of the cascade system) to help compensate against cross-wind conditions. In other words, a cascade system of a first engine (and/or a first zone of the cascade system) may be positioned to produce a first reverse thrust (e.g., a first net thrust) and a cascade system of a second engine (and/or a second zone of the cascade system) of the aircraft may be positioned to produce a second reverse thrust that is different (e.g., greater or less) than the first reverse thrust. In some examples, the example reverse thrust systems disclosed herein may be employed to help steer the aircraft.

To control and/or vary an amount of reverse thrust, the example reverse thruster systems disclosed herein include example cascade systems having a cascade forming or defining a reverse thrust flow path of an aircraft engine. In particular, the cascade articulates, lifts, slides and/or moves forward and aft relative to one or more fixed structures, a frame, and/or a door (e.g., a reverse thruster blocker door). As a result, the cascade may be employed to divert and/or vary an intensity of the reverse thrust. In other words, a portion of fluid or air directed in a reverse direction relative to a cascade system is proportional to a corresponding position of the cascade relative to the fixed structure and/or the frame or door. To this end, the cascade is capable of altering, changing and/or varying an angle of attack of a cascade system disclosed herein (e.g., between a first or maximum angle of attack and a second or minimum angle of attack). More specifically, the cascade slides relative to the frame to change an angle of attack of the reverse thrust flow path when the cascade moves relative to the frame and/or door between a first position or stowed position (e.g., a non-deployed position) and a second position or deployed position. In this manner, an amount of reverse thrust produced by the cascade system can be controlled or altered (e.g., increased or decreased) by controlling the position of the cascade relative to the frame. In some examples, the cascade of the example cascade systems disclosed herein transitions to an intermediate position at which reverse thrust is partially produced. In other words, the partially produced reverse thrust is greater than the reverse thrust produced when the cascade system is in the stowed position and less than the reverse thrust produced when the cascade system is in the deployed position.

To move the cascade of the example cascade systems between the stowed and deployed positions, the cascade of the example cascade system disclosed herein is slidably and/or rotatably coupled to the frame. More specifically, a cascade assembly of an example cascade system disclosed herein may include a cascade and a frame, where the cascade slidably and/or rotatably couples to the frame via a slot formed in the frame that supports the cascade. In some examples, the cascade is coupled to a drive including a rack-and-pinion assembly that operatively couples the cascade to a drive system. The drive system, in turn, actuates the cascade between the stowed and deployed positions relative to the frame via the rack-and-pinion assembly. In some examples, a link couples the cascade to the rack-and-pinion assembly.

In some examples, to create reverse thrust, a door adjacent the cascade system moves between an open position to direct airflow through the reverse thrust flow path of the cascade system circumferentially outward and/or in a generally forward direction and a closed position to prevent airflow through the reverse thrust flow path. In some examples disclosed herein, the cascade of the example cascade system is operatively coupled to the door and moves (e.g., automatically) between the stowed position and the deployed position as the door moves between the open and closed positions. In some examples, the cascade of the cascade system employs a drive system that operates independently from a drive system that actuates the door such that the cascade does not move between the stowed and deployed positions as the door moves between the open and closed positions.

The example cascade systems disclosed herein may be operated manually via controls available and/or accessible via a cockpit of an aircraft and/or may be operated automatically via a control system.

FIG. 1 illustrates an example aircraft 100 including wings 102 (e.g., a right wing and a left wing) extending laterally outward from a fuselage 104. Each of the wings 102 of the illustrated example supports an aircraft engine 106 via a pylon 108. Each aircraft engine 106 of the illustrated example is a turbofan engine that may embody aspects of the teachings of this disclosure. For example, the aircraft engine 106 illustrated in FIG. 1 includes a reverse thruster system 110 constructed in accordance with the teachings disclosed herein.

Figure 2:
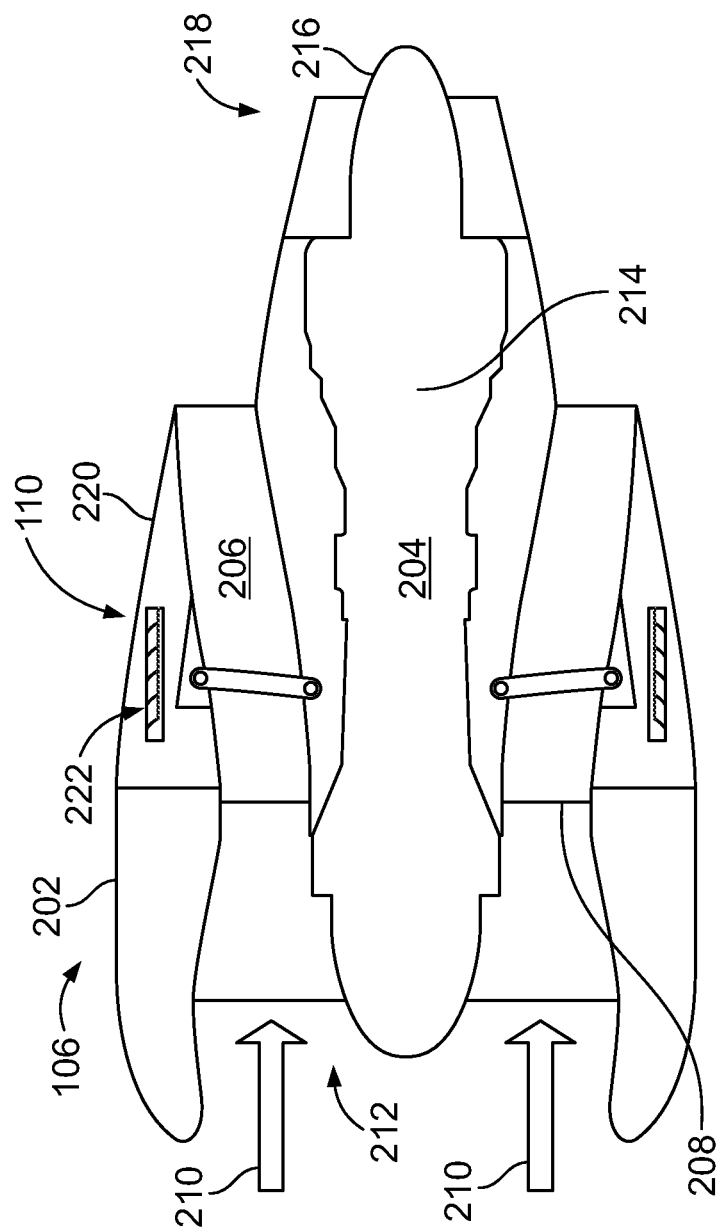
FIG. 2 is a cross-sectional view of an example aircraft engine of FIG. 1 having a reverse thruster system constructed in accordance with the teachings disclosed herein.

FIG. 2 is a cross-sectional view of the example aircraft engine 106 of FIG. 1. As illustrated in FIG. 2, the aircraft engine 106 includes a nacelle 202, an engine core 204, and a bypass 206 defined between the nacelle 202 and the engine core 204. The aircraft engine 106 is a gas turbine (e.g., a turbofan engine) having a fan 208 that draws airflow 210 into an air intake 212. A portion of the airflow 210 flows to the engine core 204 and a portion of the airflow 210 flows through the bypass 206. The air provided by the air intake 212 to the engine core 204 is highly pressurized (e.g., via a compressor) and provided to a combustion chamber 214 of the engine core 204, where fuel is injected and mixed with the highly pressurized air and ignited. The thermal energy from the combustion chamber 214 of the engine core 204 is exhausted (e.g., via a turbine) to a nozzle 216 where it mixes with a portion of the airflow (e.g., cool air) that was accelerated by the fan 208 through the bypass 206. The converted thermal energy of the engine core 204 and the accelerated airflow of the bypass 206 are exhausted from an aft end 218 of the engine 200 to produce forward thrust that provides lift and/or propels the aircraft 100 (e.g., in a forward direction).

The reverse thruster system 110 of the example aircraft engine 106 includes an outer sleeve or outer panel 220 that moves or actuates between a stowed position (e.g., a non-deployed position) and a deployed position to selectively cover or uncover a cascade system 222 of the example reverse thruster system 110. As illustrated in FIG. 2, the outer panel 220 of the reverse thruster system 110 forms a portion of the nacelle 202. As described in greater detail below, airflow in the bypass 206 is unaffected by the reverse thruster system 110 when the outer panel 220 is in the stowed position and, thus, the airflow of the bypass 206 flows toward the nozzle 216. When the reverse thruster system 110 is in the deployed position, airflow (e.g., a portion or substantially all of the airflow) flowing through the bypass 206 is directed or diverted through the cascade system 222 circumferentially outward from the nacelle 202 and/or away from the aft end 218 to produce reverse thrust.

Figure 3:
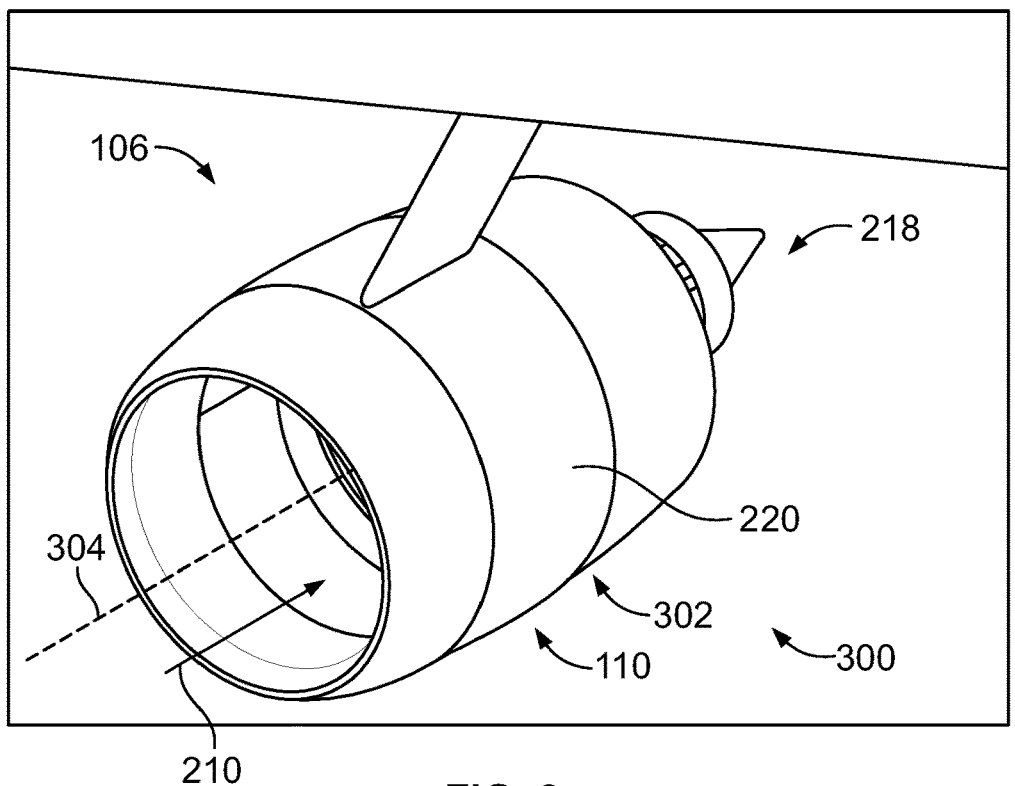
FIG. 3 illustrates the example aircraft engine of FIG. 1 showing the reverse thruster system in a non-deployed position.

FIG. 3 is a perspective view of the example aircraft engine 106 of FIG. 1 showing the reverse thruster system 110 (FIG. 2) in a non-deployed position 300. In the non-deployed position 300, the outer panel 220 is in a stowed or closed position 302. In the closed position 302, the outer panel 220 covers the cascade system 222 (FIG. 2) to prevent air in the bypass 206 (FIG. 2) from being directed or diverted through the cascade system 222. In other words, the airflow 210 from the air intake 212 that flows through the bypass 206 is prevented from flowing circumferentially outward from the aircraft engine 106. Instead, the airflow 210 from the air intake 212 flows through the bypass 206 in a direction substantially parallel to a longitudinal axis 304 of the aircraft engine 106 and, thus, exits the aircraft engine 106 via the aft end 218 of the aircraft engine 106. As a result of the outer panel 220 being in the closed position 302, the cascade system 222 is prevented from producing reverse thrust (i.e., the reverse thruster system 110 is in the non-deployed position 300).

Figure 4:
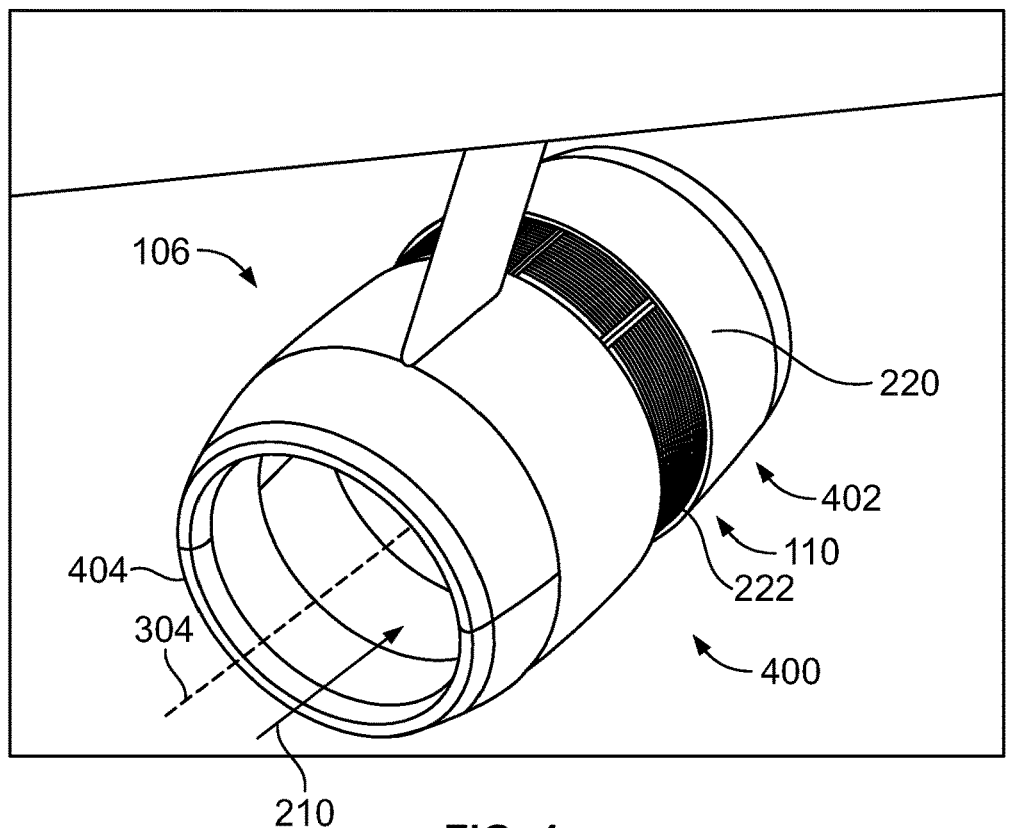
FIG. 4 illustrates the example aircraft engine of FIG. 1 showing the reverse thruster system in a deployed position.

FIG. 4 is a perspective view of the example aircraft engine 106 of FIG. 1 showing the reverse thruster system 110 in a deployed position 400. As illustrated in FIG. 4, the outer panel 220 is in an activated or open position 402 to expose the cascade system 222 of the reverse thruster system 110. When the cascade system 222 is exposed, a portion and/or substantially all of the airflow 210 of the bypass 206 (FIG. 2) is directed or diverted in a direction non-parallel relative to the longitudinal axis 304 of the aircraft engine 106. For example, the cascade system 222 of the illustrated example directs airflow from the bypass 206 circumferentially outward and/or substantially toward a front end 404 (i.e., toward the air intake 212) of the aircraft engine 106 to enable the aircraft engine 106 to produce reverse thrust.

Figure 5:
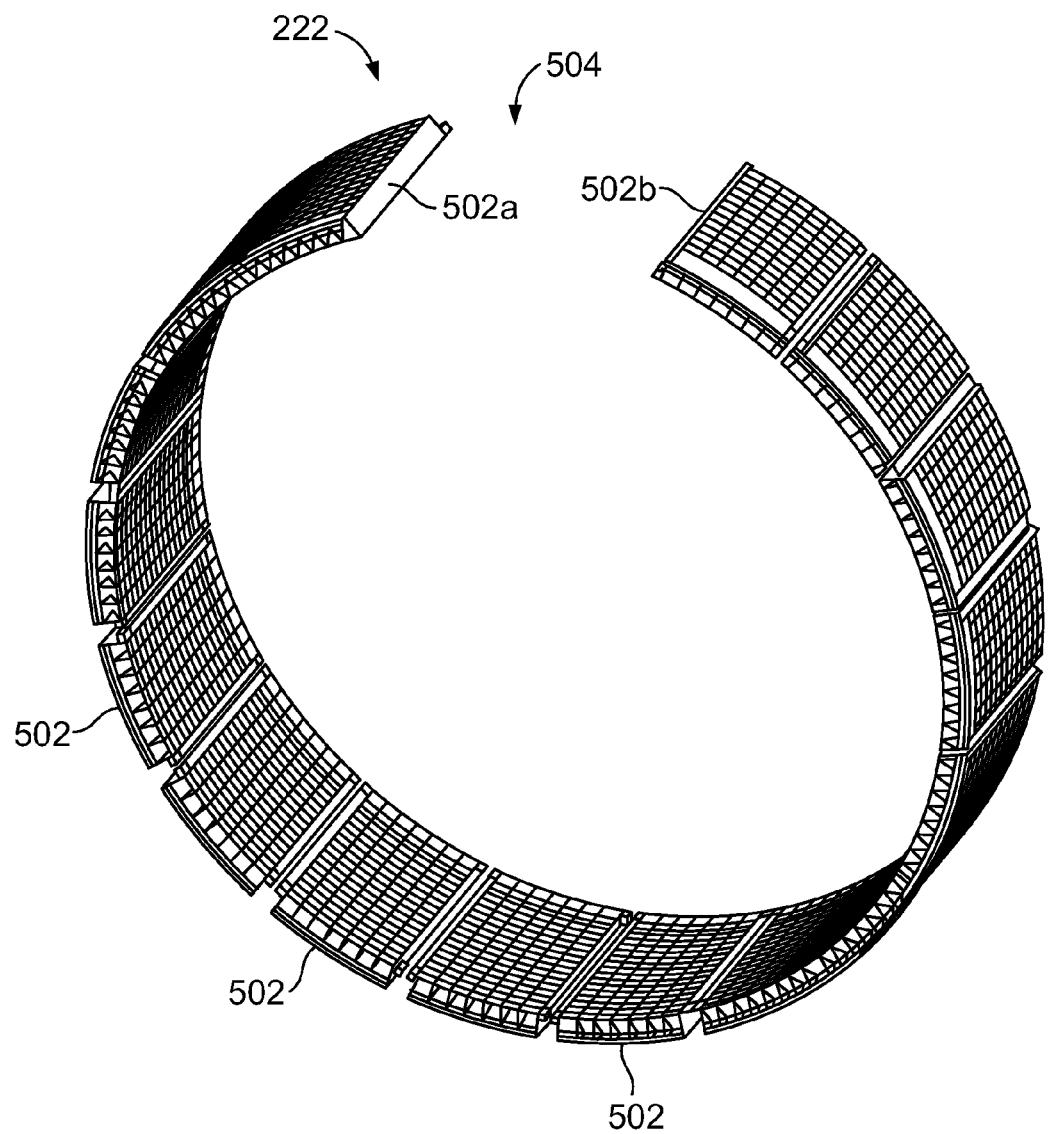
FIG. 5 illustrates an example cascade system of the example reverse thruster system of FIGS. 1-4.

FIG. 5 is a perspective view of the example cascade system 222 shown in FIG. 3. The cascade system 222 of the illustrated example has a plurality of cascade assemblies 502. The cascade assemblies 502 of the illustrated example are positioned or attached side-by-side in a semicircular and/or partial ring shaped profile. When coupled to the example aircraft engine 106, the cascade system 222 configuration of the illustrated example at least partially surrounds and/or encompasses the engine core 204. Thus, when coupled to the aircraft engine 106, the cascade assemblies 502 of the illustrated example form a gap 504 between a first cascade assembly 502a and a second assembly cascade 502b to accommodate the pylon 108 that couples the aircraft engine 106 to the wing 102 of the aircraft 100 (FIG. 1). The cascade assemblies 502 of the illustrated example are configured to alter, vary and/or otherwise change an amount of reverse thrust produced by the reverse thruster system 110. The cascade assembly may be operated via a plurality of different drive systems such as, for example, described in connection with FIGS. 6A, 6B, 7, 8A, 8B and 9-12.

Figure 6A:
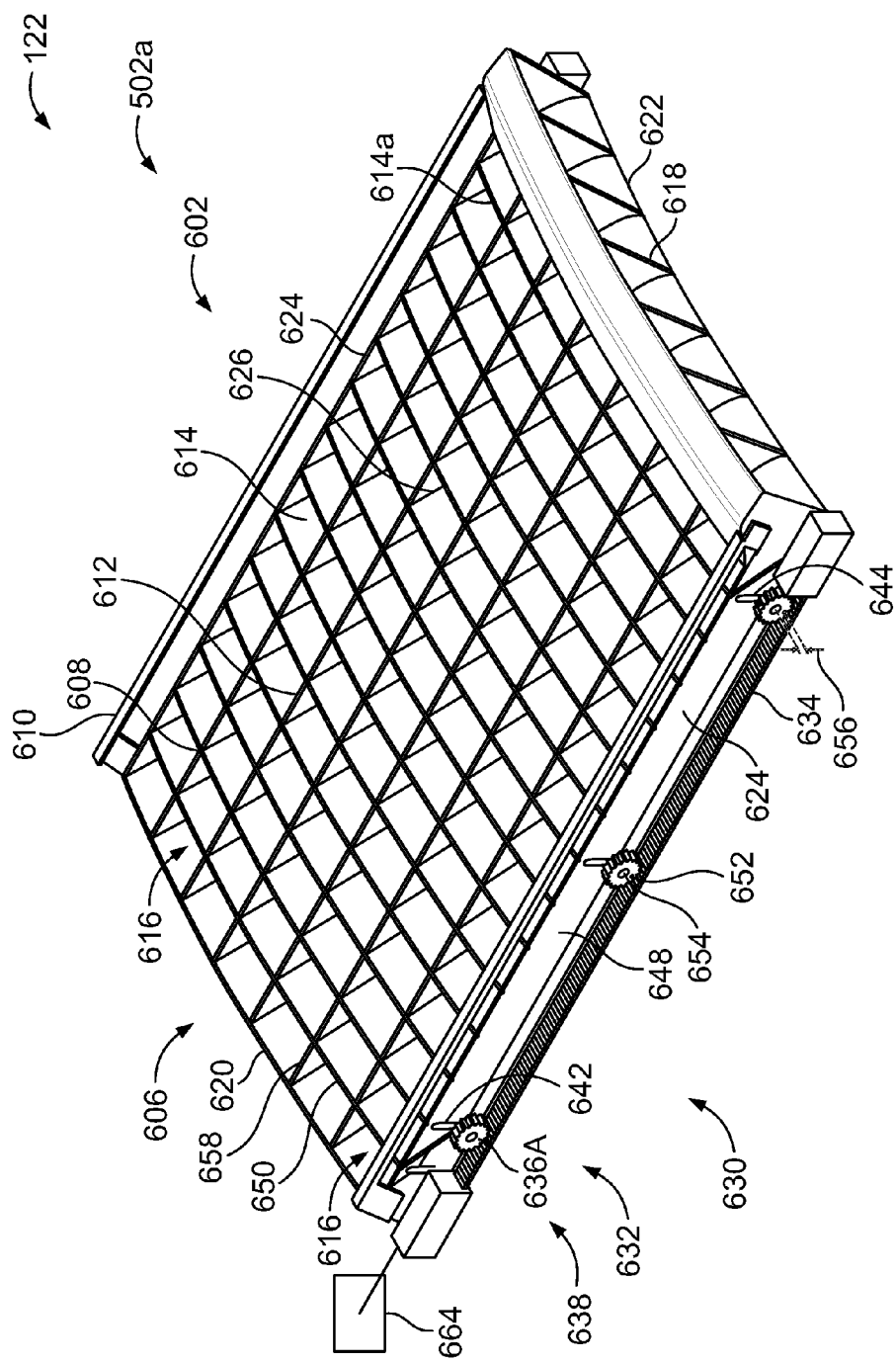
FIG. 6A illustrates an example cascade assembly of the example cascade system of FIG. 5 in a first position and implemented via an example drive system disclosed herein.
Figure 6B:
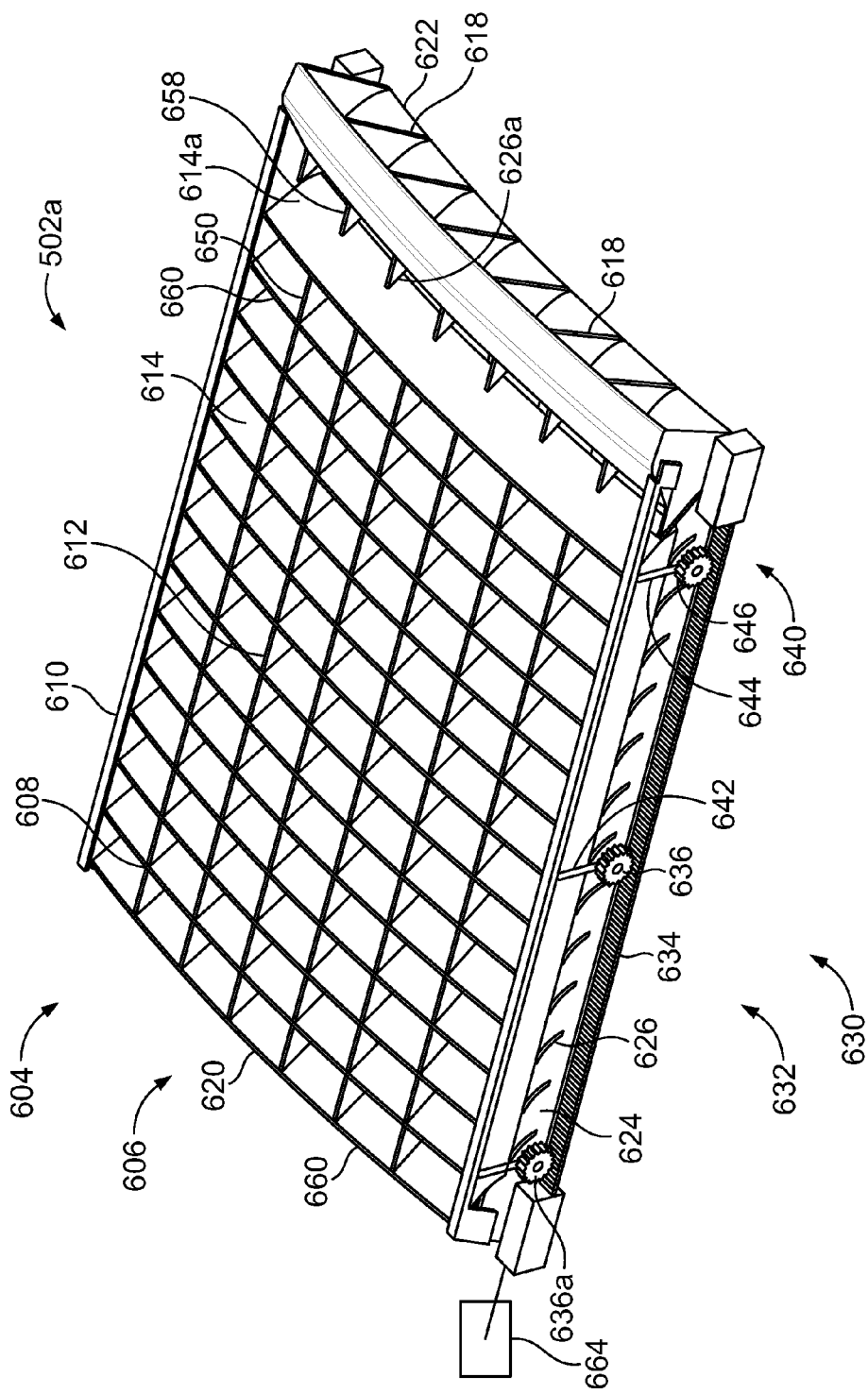
FIG. 6B illustrates the example cascade assembly of FIG. 6A in a second position.
Figure 6C:
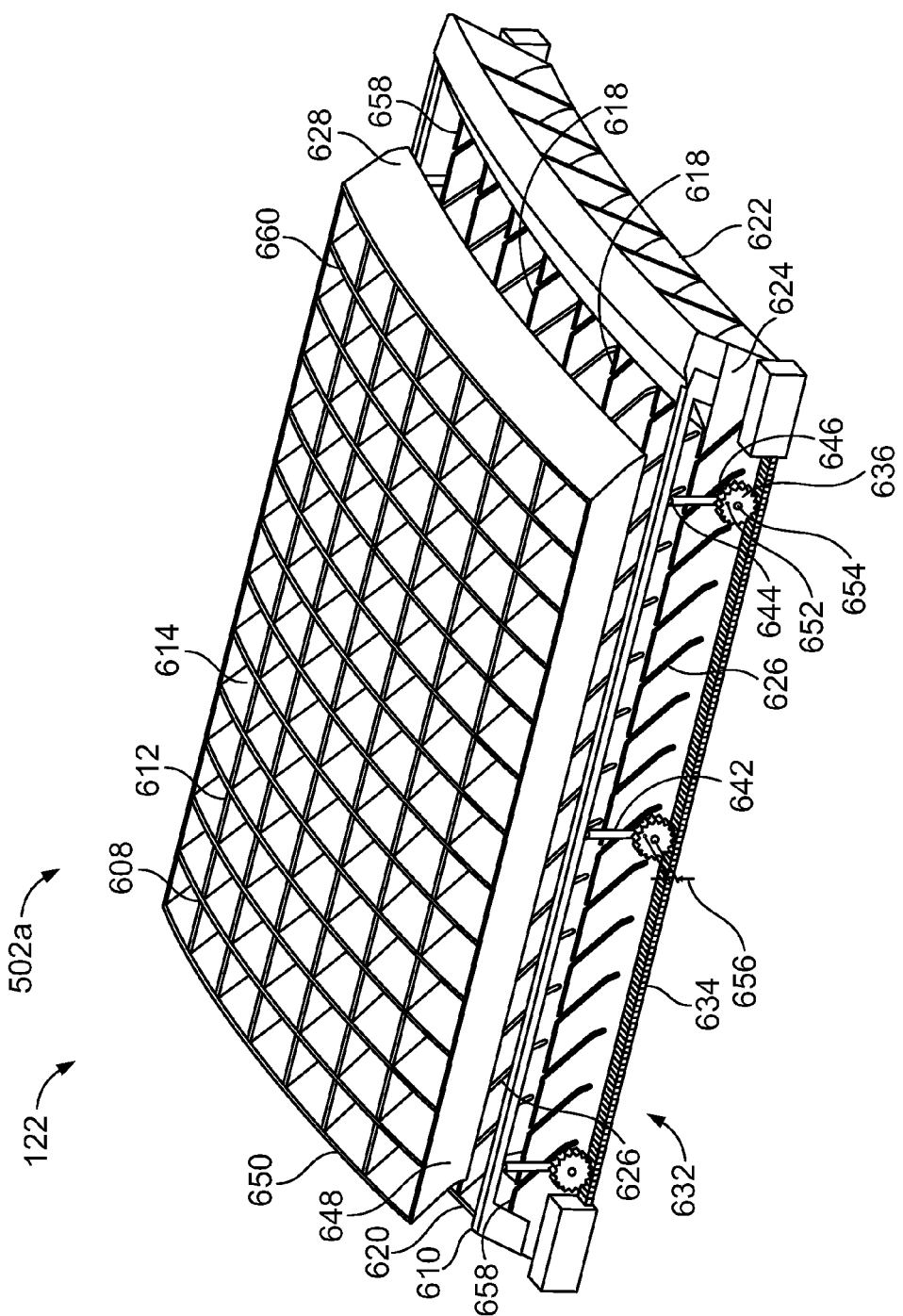
FIG. 6C illustrates an exploded view of the example cascade assembly of FIGS. 6A and 6B.

FIG. 6A illustrates the example cascade assembly 502a of the example cascade system 222 of FIG. 5 shown in a first position 602. FIG. 6B illustrates the example cascade assembly 502a of FIG. 6A in a second position 604. FIG. 6C is an exploded assembly view of the example cascade assembly 502a of FIGS. 6A and 6B. The cascade assembly 502a of the illustrated example defines a reverse thrust flow path 606 that directs airflow out of the bypass 206 (FIG. 2) of the aircraft engine 106 to produce reverse thrust. More specifically, reverse thrust produced by the reverse thrust flow path of 606 the illustrated example is variable. To vary the reverse thrust via the reverse thrust flow path 606, at least a portion of the cascade assembly 502a of the illustrated example moves between the first position 602 as shown in FIG. 6A and the second position 604 shown in FIG. 6B. More specifically, the cascade assembly 502a provides a first reverse thrust in the first position 602 and the cascade assembly 502a provides a second reverse thrust in the second position 604 different than the first reverse thrust. In some examples, as discussed in greater detail below, the cascade assembly 502a of the illustrated example is movable to an intermediate position between the first and second positions 602 and 604. In the intermediate position, the cascade assembly 502a provides a reverse thrust that is greater than the first reverse thrust produced when the cascade assembly 502a is in the first position 602 and less than the second reverse thrust produced when the cascade assembly 502a is in the second position 604.

Referring to FIGS. 6A-6C, to provide a variable reverse thrust flow path 606, the cascade assembly 502a of the illustrated examples includes a cascade 608 that slides, rotates, translates, lifts and/or otherwise moves relative to a cascade frame 610. In the illustrated example, the cascade 608 includes a first plurality of vanes 612 that intersects a second plurality of vanes 614. As illustrated in FIGS. 6A-6C, the first vanes 612 and the second vanes 614 are substantially perpendicular. In the illustrated examples, the first vanes 612 have a substantially planar profile and the second vanes 614 have an arcuate and/or curved profile. However, in other examples, the first and second vanes 612 and 614 may have planar profiles and/or curved profiles. As shown in the illustrated example, the first vanes 612 are fixed relative to the second vanes 614.

As illustrated in FIGS. 6A-6C, the intersecting first and second vanes 612 and 614 define a plurality of openings 616 that (e.g., collectively) define the reverse thrust flow path 606. In particular, the cascade 608 of the illustrated example includes eight first vanes 612 and fourteen second vanes 614. As a result, the first and second vanes 612 and 614 of the cascade 608 form or define the reverse thrust flow path 606 having a grid profile or shape. In some examples, more or fewer number of first vanes 612 and/or second vanes 614 may be provided in the cascade 608 of the cascade assembly 502a such that more or fewer rows and/or columns of vanes are included in a grid that defines the reverse thrust flow path 606. As a result, a size (e.g., an area) of the openings 616 may be larger when fewer vanes are provided or the size (e.g., the area) of the openings 616 may be smaller when more vanes are provided.

In the illustrated example, the cascade frame 610 includes fixed supports or structures 618 that extend between a first end 620 of the cascade frame 610 and a second end 622 of the cascade frame 610. Further, the outermost fixed structures 618 of the illustrated example also define at least portions of side walls 624 of the cascade frame 610. As shown in FIGS. 6A-6C, the fixed structures 618 have a substantially planar profile and are substantially parallel relative to each other. As shown in the illustrated example, the fixed structures 618 of the cascade frame 610 are substantially parallel to the first vanes 612 of the cascade 608. Because the fixed structures 618 are substantially parallel to the first vanes 612, the fixed structures 618 do not interfere with and/or obstruct movement of the first vanes 612 when the first vanes 612 move (along with the second vanes 614) between the first and second positions 602 and 604. As a result, the fixed structures 618 are prevented from interfering with and/or obstructing movement of the cascade 608 between the first position 602 and the second position 604.

The second vanes 614 of the illustrated example extend across the fixed structures 618 between the side walls 624 of the cascade frame 610 such that each of the second vanes 614 is substantially perpendicular relative to the fixed structures 618 of the cascade frame 610. To enable the movement of the second vanes 614 and, thus, the cascade 608 relative to the cascade frame 610 between the first and second positions 602 and 604, each of the fixed structures 618 of the cascade frame 610 of the illustrated example includes guides, channels and/or slots 626. Each of the slots 626 receives at least a portion 628 (e.g., a lower end or edge) (FIG. 6C) of respective ones of the second vanes 614 of the cascade 608. For example, a first row of slots 626a formed in the fixed structures 618 receive at least a portion of a second vane 614a of the cascade 608. In the illustrated example, the slots 626 have an arcuate and/or curved profile or shape to accommodate an arcuate and/or curved profile of the second vanes 614.

In addition, to enable movement of the cascade 608 relative to the cascade frame 610 between the first and second positions 602 and 604 and/or along the slots 626 of the fixed structures 618, the example cascade system 122 of the illustrated example employs a drive system 630. The drive system 630 of the illustrated example employs a rack-and-pinion assembly 632. The rack-and-pinion assembly 632 includes a rack 634 enmeshed or otherwise operatively coupled to at least one pinion 636a (e.g., spur gear). In the illustrated example, the rack-and-pinion assembly 632 includes a plurality of pinions 636 (e.g., three pinions). Each of the pinions 636 is operatively coupled to the cascade 608 such that movement of the rack 634 between a first position 638 of the drive system 630 shown in FIG. 6A and a second position 640 of the drive system 630 shown in FIG. 6B causes the cascade 608 to move or slide (e.g., lift) relative to the cascade frame 610 and/or the slots 626 between the first position 602 and the second position 604.

The cascade 608 is coupled to the pinions 636 of the illustrated example via respective links 642 such that each of the pinions 636 and each of the links 642 operatively couples to the cascade 608 of the cascade assembly 502a. Each of the links 642 of the illustrated example includes a first end 644 coupled to the cascade 608 and a second end 646 coupled to a respective one of the pinions 636. For example, the first end 644 of each of the links 642 is coupled or attached to a side wall 648 (FIG. 6C) of the cascade 608 defined by the outermost first vanes 612. In the illustrated example, the first end 644 of each of the links 642 is coupled to the side wall 648 adjacent an outer end or outer edge 650 (e.g., an upper edge) of the cascade 608. The second end 646 of each of the links 642 is coupled or attached (e.g., pinned) to respective ones of the pinions 636 at a position 652 (FIG. 6C) offset or eccentric relative to an axis of the rotation 654 of the pinions 636 by a distance 656. In this manner, rotation of the pinions 636 causes the links 642 to move, lift, slide and/or translate (e.g., reciprocate relative to the rack 634), thereby causing the cascade 608 to move relative to the cascade frame 610. For example, the first end 644 of each of the links 642 moves away from and/or toward the rack 634 and/or the cascade frame 610 when the cascade 608 moves between the first and second positions 602 and 604. Further, because the second ends 646 of the respective links 642 are eccentrically coupled to the respective pinions 636, the second ends 646 of the respective links 642 rotate and translate (e.g., upward in the orientation of FIGS. 6A-6C) when the pinions 636 rotate. As noted above, the slots 626 of the fixed structures 618 guide movement of the cascade 608.

To move the cascade 608 between the first position 602 and the second position 604 of the cascade assembly 502a, the rack 634 of the illustrated example is moved between the first position 638 and the second position 640. For example, the rack 634 is moved to the first position 638 in a direction toward the first end 620 of the cascade frame 610 to cause the pinions 636 to rotate in a first direction about the axis of rotation 654 (e.g., in a clockwise direction in the orientation of FIGS. 6A and 6B). As a result, the second ends 646 of the links 642 move toward the rack 634 as the pinions 636 rotate in the first direction, which causes the first ends 644 of the links 642 to move the outer edge 650 of the cascade 608 toward the rack 634 and/or the cascade frame 610. Referring to FIG. 6A, when the cascade assembly 502a is in the first position 602, the outer end or edge 650 of the cascade 608 is adjacent an outer end or edge 658 (e.g., an upper edge) of the fixed structures 618 and/or the cascade frame 610. In other words, the outer edges 650 and 658 are substantially flush and/or substantially aligned when the cascade assembly 502a is in the first position 602.

Referring to FIG. 6B, the rack 634 is moved to the second position 640 in a direction toward the second end 622 of the cascade frame 610 to move the cascade 608 to the second position 604. Movement of the rack 634 toward the second position 640 causes each of the pinions 636 to rotate in a second direction about the axis of rotation 654 (e.g., in a counterclockwise direction in the orientation of FIGS. 6A and 6B). As the pinions 636 rotate in the second direction, the links 642 move (e.g., rotate and translate) relative the cascade frame 610 and/or the rack 634. Because the second ends 646 of the links 642 are eccentrically coupled to the pinions 636, the first end 644 of each of the links 642 causes the cascade 608 to slide or translate along the slots 626 of the fixed structures 618. Referring to FIG. 6B, when the cascade assembly 502a is in the second position 604, the outer edge 650 of the cascade 608 is spaced away or offset (e.g., non-flush) relative to the outer edges 658 of the fixed structures 618. As a result, a distance between the outer edge 650 of the cascade 608 and the outer edges 658 of the fixed structures 618 in the second position 604 is greater than a distance (e.g., substantially zero or less than about 0.25 inches) between the outer edge 650 of the cascade 608 and the outer edges 658 of the fixed structures 618 in the first position 602. Thus, the rack-and-pinion assembly 632 moves the cascade 608 of the cascade assembly 502*a* relative to the cascade frame 610 between the first and second positions 602 and 604 to change a direction of airflow (e.g., an angle of attack) of the reverse thrust flow path 606 to affect or vary an amount of reverse thrust produced by the cascade assembly 502*a*. Further, although the cascade 608 rotates (and translates) relative to the cascade frame 610 to vary the reverse thrust, the cascade 608 remains substantially parallel relative to the cascade frame 610 when the cascade 608 moves between the first and second positions 602 and 604. For example, the outer edge 650 (e.g., the upper surface) of the cascade 608 remains substantially parallel relative to the outer edge 658 (e.g., the upper surface) of the cascade frame 610 and/or the fixed structure 618 when the cascade 608 moves relative to the cascade frame 610.

In the illustrated example, each of the first vanes 612, the second vanes 614, the fixed structures 618, the pinions 636 and/or the links 642 have a substantially similar size, shape, and/or profile relative to the other respective ones of the first vanes 612, the second vanes 614, the fixed structures 618, the pinions 636 and/or the links 642. As a result, an angle of attack or orientation of one of the second vanes 614 is similar or substantially the same as an angle of attack of another of the second vanes 614. Further, because each of the first and second vanes 612 and 614 is fixed, the first vanes 612 of the cascade 608 move synchronously with the second vanes 614 of the cascade 608 when the rack 634 moves between the first and second positions 638 and 640. In other examples, the size, shape and/or profile of each of the first vanes 612, the second vanes 614, the fixed structures 618, the pinions 636 and/or the links 642 may vary, thereby causing an angle of attack of one of the second vanes 614 to be different than an angle of attack of another of the second vanes 614 when the cascade assembly 502*a* is in the first position 602 or the second position 604. For example, the profile of each of the second vanes 614 of the cascade 608 in the second position 604 is positioned (e.g., curved and/or angled) in a direction closer to the first end 620 of the cascade assembly 502*a* than the profile of each of the second vanes 614 in the first position 602. In some examples, a profile or shape of edges (e.g., upper tips) of the first vanes 612 and/or the second vanes 614 of the cascade 608 may be arcuate and/or curved. For example, an edge or outer end 660 (e.g., an upper edge) of each of the second vanes 614 may be curved relative to an edge opposite the outer end 660. In some examples, the first vanes 612 and/or the second vanes 614 of the cascade 608 may have a bowed profile or shape. As a result of the cascade assembly 502*a* being in the second position 604, air that flows through the reverse thrust flow path 606 when the cascade assembly 502*a* is in the second position 604 is directed or diverted toward the front 404 of the aircraft engine 106 (e.g., away from the aft end 218 of the aircraft engine 106) at a greater angle than when the cascade assembly 502*a* is in the first position 602 to increase an amount of reverse thrust produced by the aircraft engine 106. Thus, a direction in which the reverse thrust flow path 606 of the cascade assembly 502*a* directs or diverts airflow from the bypass 206 (FIG. 2) changes or varies as the cascade 608 transitions between the first position 602 and the second position 604.

In the illustrated example, the rack-and-pinion assembly 632 is positioned adjacent each of the side walls 624. However, in some examples, the rack-and-pinion assembly 632 is positioned only adjacent one of the side walls 624. In some examples, the rack 634 has a width sufficient to engage one or more pinions 636 of the example cascade assembly 502*a* and a plurality of pinions of another one of the cascade assemblies 502 adjacent the cascade assembly 502*a*. In this manner, the drive system 630 may be configured to operate two adjacent cascades. To move the rack 634 between the first and second positions 638 and 640, the example drive system 630 of the illustrated example may employ an actuator 664. In some examples, each of the racks 634 adjacent each of the side walls 624 of the cascade frame 610 may be moved or driven via respective dedicated actuators.

Figure 7:
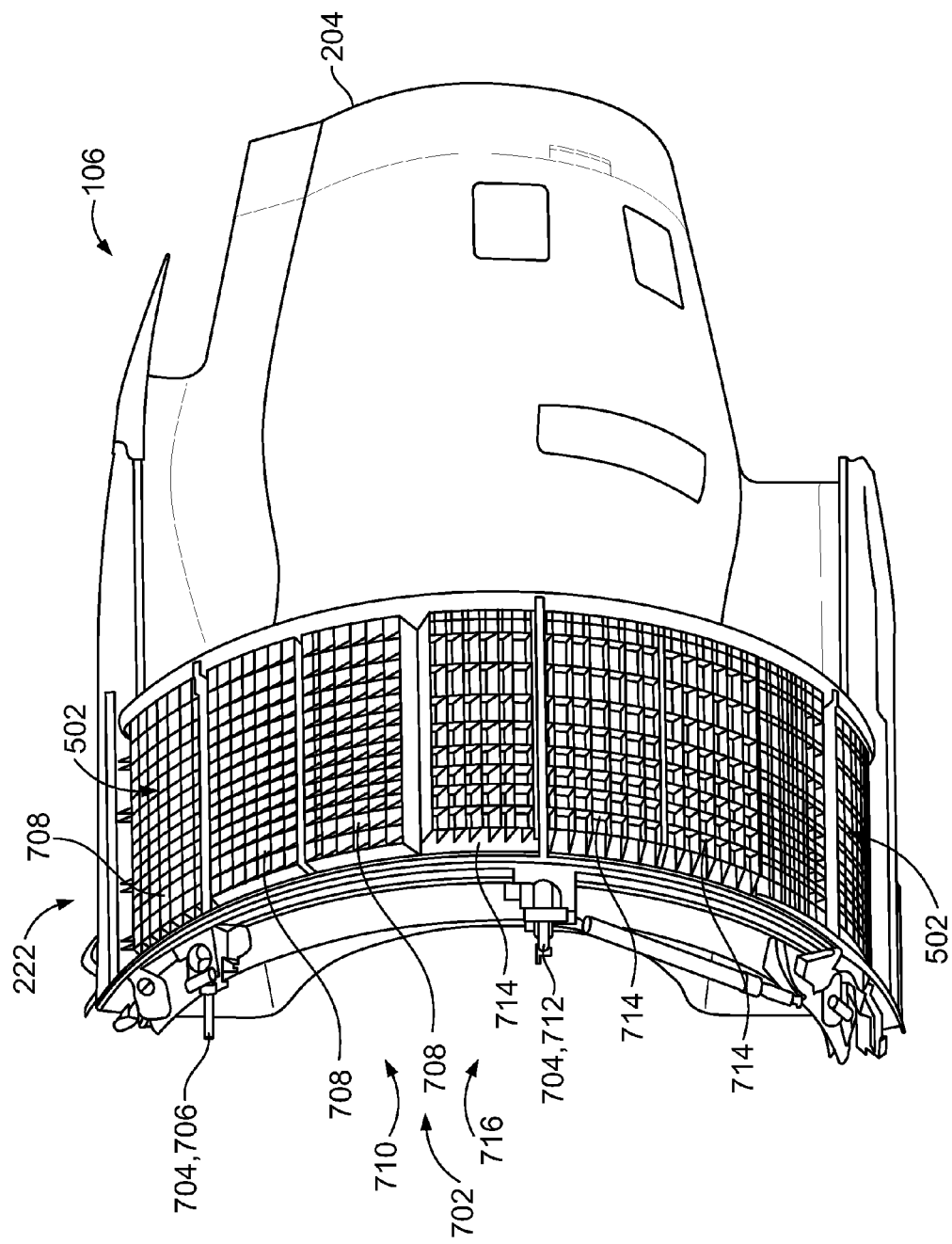
FIG. 7 is a partial, cutaway view of the example aircraft engine of FIGS. 1-4 showing the example cascade system of FIGS. 5, 6A and 6B implemented with another example drive system disclosed herein.

FIG. 7 depicts a partial cutaway view of the example aircraft engine 106 showing a portion of the cascade system 222 implemented with another example drive system 702. The example drive system 702 enables zoned operation of the cascade system 222. As illustrated in FIG. 7, the example drive system 702 employs a plurality of actuators 704 to operate the cascade assemblies 502 within different zones. For example, a first actuator 706 operates a first plurality of cascade assemblies 708 in a first zone 710 and a second actuator 712 operates a second plurality of cascade assemblies 714 in a second zone 716. For example, the first and second plurality of cascade assemblies 708 and 714 of the respective first and second zones 710 and 716 each include three cascade assemblies 502. To enable zoned operation, the first actuator 706 moves a first common plate or panel having a rack (e.g., the rack 634) of each of the cascade assemblies 708 of the first zone 710 attached thereto such that movement of the first common plate or panel moves the racks of the first cascade assemblies 708 in the first zone 710 simultaneously. Likewise, the second actuator 712 moves a second common plate or panel having a rack (e.g., the rack 634) of each of the second cascade assemblies 714 of the second zone 716 attached thereto such that movement of the second common plate or panel moves the racks of the second plurality of cascade assemblies 714 simultaneously. In some examples, any number of actuators 704 may be employed to define and operate different zones. In some such examples, each of the actuators 704 is operatively coupled to two adjacent cascade assemblies 502. In some examples, only one actuator 704 is employed to operate all of the cascade assemblies 502 (e.g., simultaneously).

The example drive system 630 of FIGS. 6A and 6B and the example drive system 702 of FIG. 7 enable operation of the cascade system 222 and/or movement of the cascade 608 relative to the cascade frame 610 between the first and second positions 602 and 604 of the cascade assemblies 502 independent from movement of the outer panel 220 between the closed position 302 of FIG. 3 and the open position 402 of FIG. 4. In this manner, the drive system 630 of FIGS. 6A and 6B and the drive system 702 are dedicated to operating the cascade system 222 and another drive system (e.g., a second actuator) is dedicated for moving the outer panel 220 between the closed and open positions 302 and 402. Thus, the drive systems 630 and/or 702 enable the cascade system 222 to move independently from the outer panel 220. In other words, movement of the outer panel 220 between the closed and open positions 302 and 402 does not affect movement of the rack 634, which is actuated by the drive systems 630 and/or 702 independent from the operation of the outer panel 220. In this manner, when the outer panel 220 moves to the open position 402, the cascade 608 may be adjusted relative to the cascade frame 610 between the first and second positions 602 and 604 while the outer panel 220 is in the open position 402.

In some examples, movement of the cascade 608 between the first and second positions 602 and 604 may be dependent on movement of the outer panel 220 between the closed and open positions 302 and 402. For example, movement of the outer panel 220 between the respective closed and open positions 302 and 402 may cause (e.g., automatic) movement of the rack 634 between the first and second positions 638 and 640, which may cause (e.g., automatic) movement of the cascade 608 between the first and second positions 602 and 604.

Figures 8A, 8B:
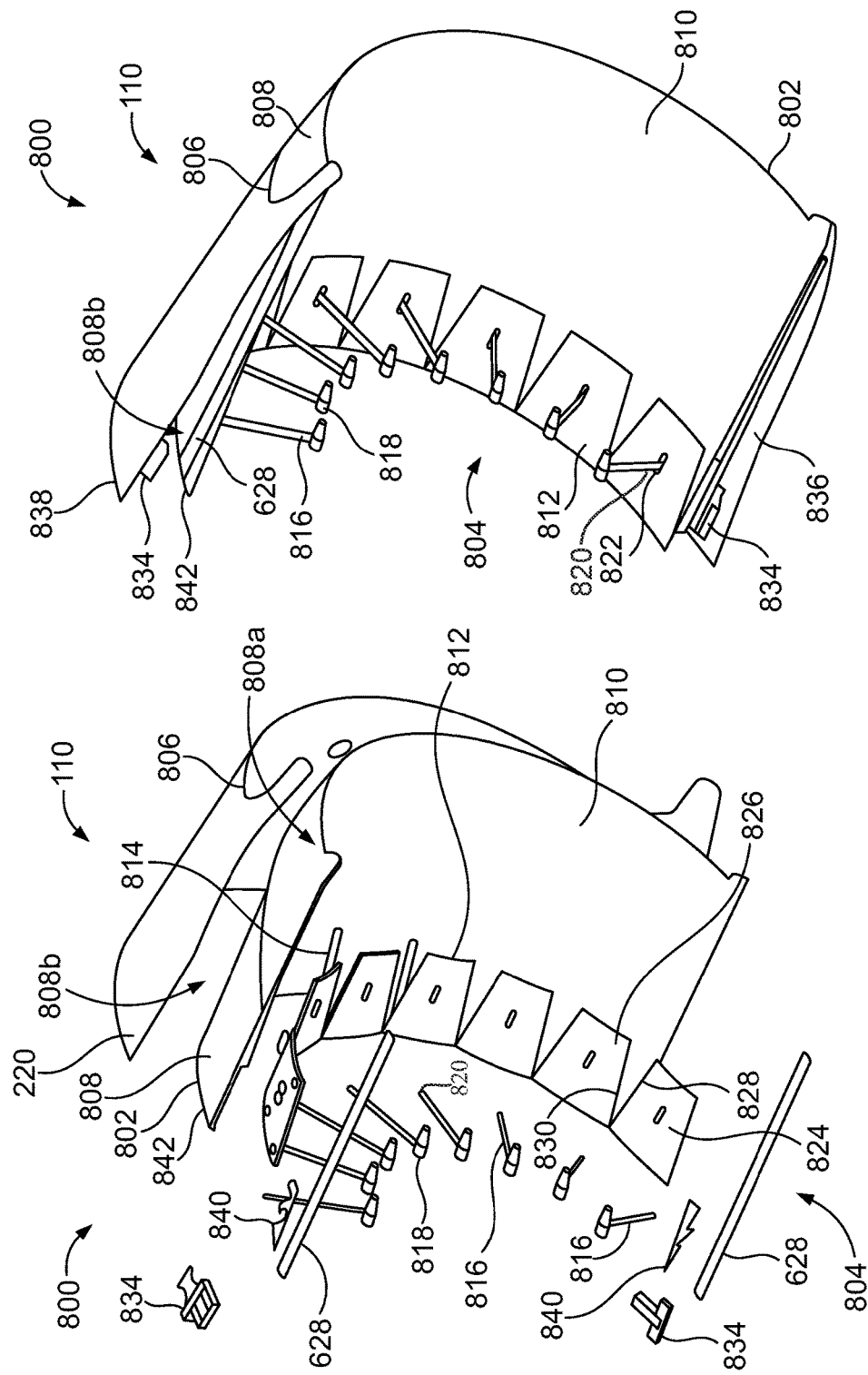
FIG. 8A is an exploded view of portions of the reverse thruster system of FIGS. 1-5, 6A and 6B, but implemented with yet another example drive system disclosed herein.
FIG. 8B is an assembled view of the example portions of the reverse thruster system of FIG. 8A.

FIG. 8A is an exploded view of portions of the reverse thruster system 110 configured with a drive system 800 that operates the outer panel 220. FIG. 8B is an assembled view of portions of the reverse thruster system 110 of FIG. 8A. For clarity in illustrating portions of the reverse thruster system 110, the cascade system 222 (FIGS. 2, 4, 5, 6A and 6B) is not shown in FIGS. 8A and 8B.

Referring to FIGS. 8A and 8B, the reverse thruster system 110 includes the outer panel 220, a translating sleeve or translating panel 802, and a door assembly 804. As more clearly shown in FIG. 8B, an end 806 of the outer panel 220 is fixed, attached and/or welded to an outer surface 808 of the translating panel 802 adjacent an end 808a of the translating panel 802. As a result, when the reverse thruster system 110 transitions between the non-deployed position 300 (FIG. 3) and the deployed position 400 (FIG. 4), movement of the translating panel 802 causes and/or results in movement of the outer panel 220. Thus, the translating panel 802 and the outer panel 220 move together as a unitary structure. A gap or space 808b is provided between the outer panel 220 and the translating panel 802 adjacent an end opposite the end 808a to accommodate the cascade system 222 (FIG. 3).

The door assembly 804 of the illustrated example is disposed in the bypass 206 that is partially defined by the translating panel 802. As illustrated in FIGS. 8A and 8B, the door assembly 804 is rotatably coupled to an inner surface 810 of the translating panel 802. The door assembly 804 includes a plurality of doors 812 that cover a plurality of openings 814 of the translating panel 802 when the reverse thruster system 110 is in the non-deployed position 400. The plurality of openings 814 of the illustrated example are circumferentially spaced about the longitudinal axis 304 (FIG. 3) of the aircraft engine 106 (FIG. 2). To cover the plurality of openings 814 in the non-deployed position 300, each of the plurality of doors 812 is adjacent, engages and/or is substantially parallel to a respective one of the plurality of openings 814. As the reverse thruster system 110 transitions to the deployed position 400, the plurality of doors 812 pivotally and/or rotatably move relative to the translating panel 802 to uncover the plurality of openings 814 and direct air flowing through the bypass 206 toward the cascade system 222. More specifically, when the reverse thruster system 110 is in a fully deployed position (e.g., the deployed position 400 of FIG. 4), each of the doors 812 moves to a blocking position and is positioned substantially perpendicular relative to the airflow through the bypass 206 (FIG. 2) to divert or direct the airflow in the bypass 206 (FIG. 2) toward the cascade system 222 (FIG. 2) to enable the aircraft engine 106 (FIG. 1) to produce reverse thrust.

As illustrated in FIGS. 8A and 8B, the door assembly 804 includes a plurality of links 816. Each of the plurality of links 816 has a pivoting end 818 that is rotatably fixed or coupled to the engine core 204 (FIG. 2) and a distal end 820 that is received by a slot or groove 822 of a respective one of the plurality of doors 812. Thus, as the reverse thruster system 110 transitions between the non-deployed position 300 and the deployed position 400, each of the plurality of links 816 enables a respective one of the plurality of doors 812 to pivot or rotate about the respective pivoting end 818. Further, each of the plurality of doors 812 has a profile or shape (e.g., a profile defining a perimeter of the doors 520) that enables a first door 824 to engage (e.g., to sealingly engage) an adjacent second door 826 when the doors 812 are in the deployed position 400. For example, each of the doors 812 of the illustrated example has a trapezoidal shape such that an edge 828 of the first door 824 moves to meet or engage an adjacent edge 830 of the second door 826 in the deployed position 400. As a result, the doors 812 collectively form a wall or obstruction in the bypass 206 to divert or direct airflow in the bypass 206 toward the cascade system 222 in the deployed position 400.

In the example drive system 800, the rack 634 (e.g., of each of the cascade assemblies 502) of a rack-and-pinion assembly (e.g., a rack-and-pinion assembly 632 discussed in FIGS. 6A and 6B of each of the cascade assemblies 502) is coupled, attached and/or fixed to the outer surface 808 of the translating panel 802. Thus, each rack 634 of the example cascade assemblies 502 of FIGS. 5, 6A and 6B may be coupled to the translating panel 802 such that each of the cascade assemblies 502 operates in unison or simultaneously with the other of the cascade assemblies 502 as the outer panel 220 moves between the closed position 302 and the open position 402. As a result, operation of the outer panel 220 between a closed position and an open position causes the cascade 608 to move between the first and second positions 602 and 604. In this manner, the rack 634 moves with the translating panel 802 as the reverse thruster system 110 transitions between the non-deployed position 300 and the deployed position 400. The rack 634 of the illustrated example extends along at least a portion of the length of the translating panel 802. As illustrated in FIGS. 8A and 8B, an auxiliary slider 834 is coupled to an inner surface 836 of the outer panel 220 adjacent a front end 838 of the outer panel 220. An end wedge 840 of the illustrated example is positioned between the outer surface 808 of the translating panel 802 and the rack 634 adjacent a front end 842 of the translating panel 802. The end wedge 840 of the illustrated example stops or prevents the rack 634 and, thus, the reverse thruster system 110 from transitioning beyond a fully non-deployed position (e.g., the non-deployed position 300 of FIG. 3).

Figure 9:
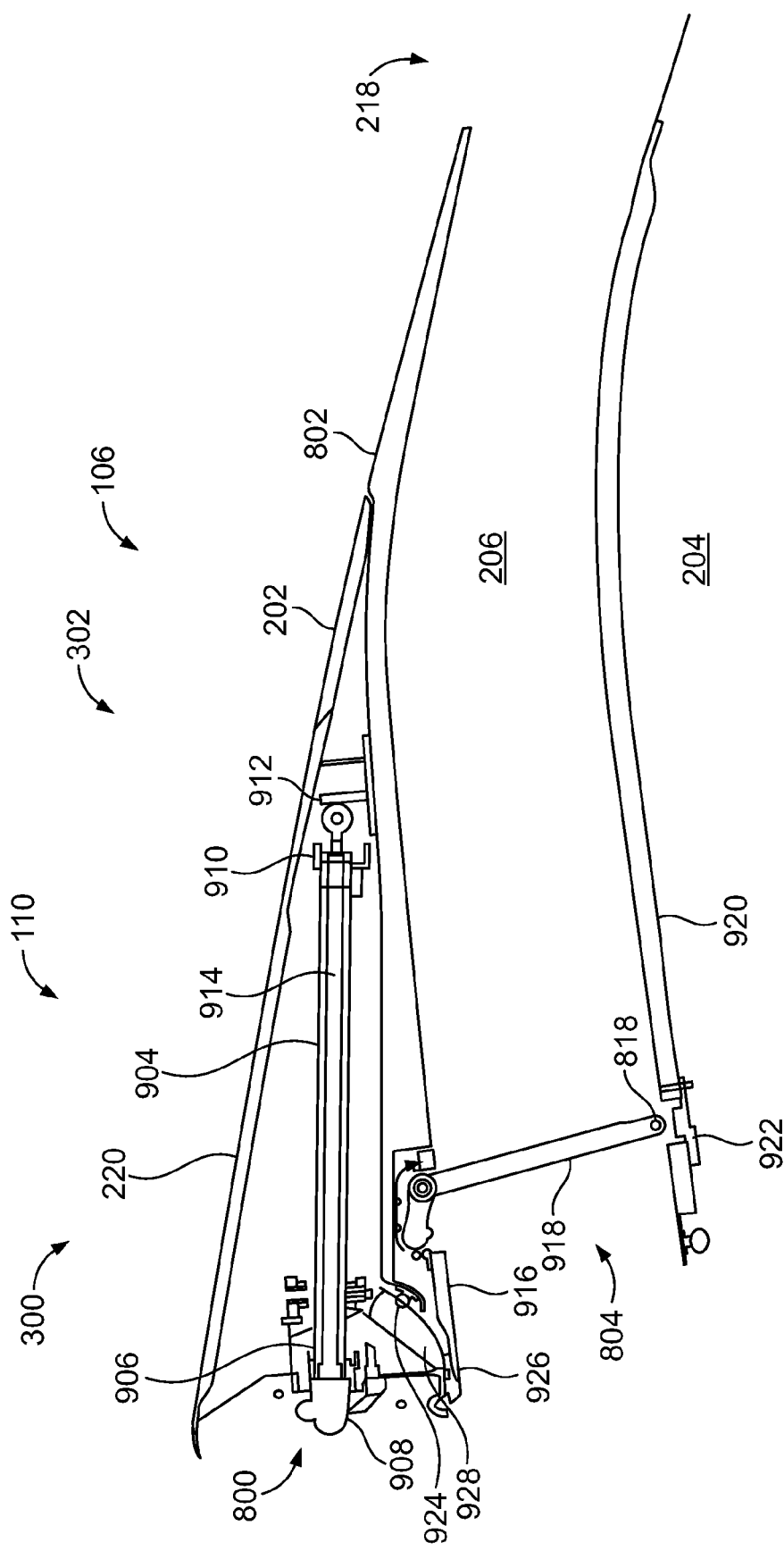
FIG. 9 is a partial, cross-sectional view of the example reverse thruster system of FIGS. 1-4 implemented with the example drive system of FIGS. 8A and 8B.

FIG. 9 is a partial, cross-sectional view of the example aircraft engine 106 showing the reverse thruster system 110 in the non-deployed position 300 and implemented with the drive system 800 shown in FIGS. 8A and 8B. The drive system 800 of the illustrated example actuates or moves the translating panel 802. Because the translating panel 802 is coupled or attached to the outer panel 220 and the door assembly 804 is rotatably coupled to the translating panel 802, the drive system 800 actuates the outer panel 220 between the closed position 302 and the open position 402 along with movement of the translating panel 802. In addition, the door assembly 804 moves between the blocking position and the non-blocking position when the outer panel 220 is in the closed position 302 and the open position 402, respectively.

The drive system 800 of the illustrated example includes an actuator 904 that is at least partially disposed between the translating panel 802 and the outer panel 220 of the nacelle 202. In the illustrated example, a first end 906 of the actuator 904 is coupled to a torque box 908 of the drive system 800 and a second end 910 opposite the first end 906 engages (e.g., is attached to) a wall 912 of the translating panel 802. To transition the reverse thruster system 110 from the non-deployed position 300 to the deployed position 400, a stem 914 of the actuator 904 extends beyond the second end 910 of the actuator 904. The stem 914 of the actuator 904 pushes, urges and/or applies a force to the wall 912 of the translating panel 802 to cause the translating panel 802 to slide or move relative to the engine core 204 in a direction toward the aft end 218 of the aircraft engine 106.

A door 916 of the plurality of doors 812 (FIGS. 8A and 8B) is pivotally coupled to the engine core 204 via a corresponding link 918 of the plurality of links 816 (FIGS. 8A and 8B). The link 918 of the illustrated example is disposed in the bypass 206 of the aircraft engine 106. In the illustrated example, the pivoting end 818 of the link 918 is rotatably or pivotally coupled to a fan duct cowl 920 via, for example, an anchor fitting 922. The distal end 820 of the link 918 is rotatably coupled to the door 916, and the door 916 is rotatably coupled to an end 924 of the translating panel 802. As illustrated in FIG. 9, the door 916 is substantially parallel to the translating panel 802 when the reverse thruster system 110 is in the non-deployed position 300 and the outer panel 220 is in the closed position 302. For example, a first end 926 of the door 916 is adjacent and/or engages a bullnose 928 to prevent the door 916 from diverting or directing airflow toward the cascade system 222 (FIG. 2). As a result, the door 916 of the door assembly 804 shown in FIG. 9 is in a non-blocking position relative to the bypass 206 to enable airflow toward the aft end 218 of the aircraft engine 106 to create forward thrust (e.g., a maximum forward thrust).

When the reverse thruster system 110 transitions from the non-deployed position 300 to the deployed position 400, the actuator 904 of the drive system 800 actuates the translating panel 802 relative to the fan duct cowl 920 to cause the link 918 to rotate (e.g., in a clockwise direction from the view point of the illustrated example) to cause the door 812 to move toward the fan duct cowl 920. When the reverse thruster system 110 reaches the deployed position 400, the first end 926 of the door 916 is adjacent and/or engages the translating panel 802, and a second end 930 of the door 916 is adjacent and/or engages the fan duct cowl 920. As a result, the door 916 pivots such that it is no longer parallel to the translating panel 802, but is substantially perpendicular relative to the translating panel 802 to form a wall or obstruction to impede airflow through the bypass 206. In such a position, the door 916 is in the blocking position and diverts or directs airflow in the bypass 206 toward cascade system 222 (FIG. 2) to create reverse thrust (e.g., a forward net thrust that is less than the maximum forward net thrust created when the outer panel 220 is in the closed position 302). Further, airflow through the cascade system 222 exits from the nacelle 202 as the outer panel 220 is in the open position 402 (FIG. 4).

Figure 10:
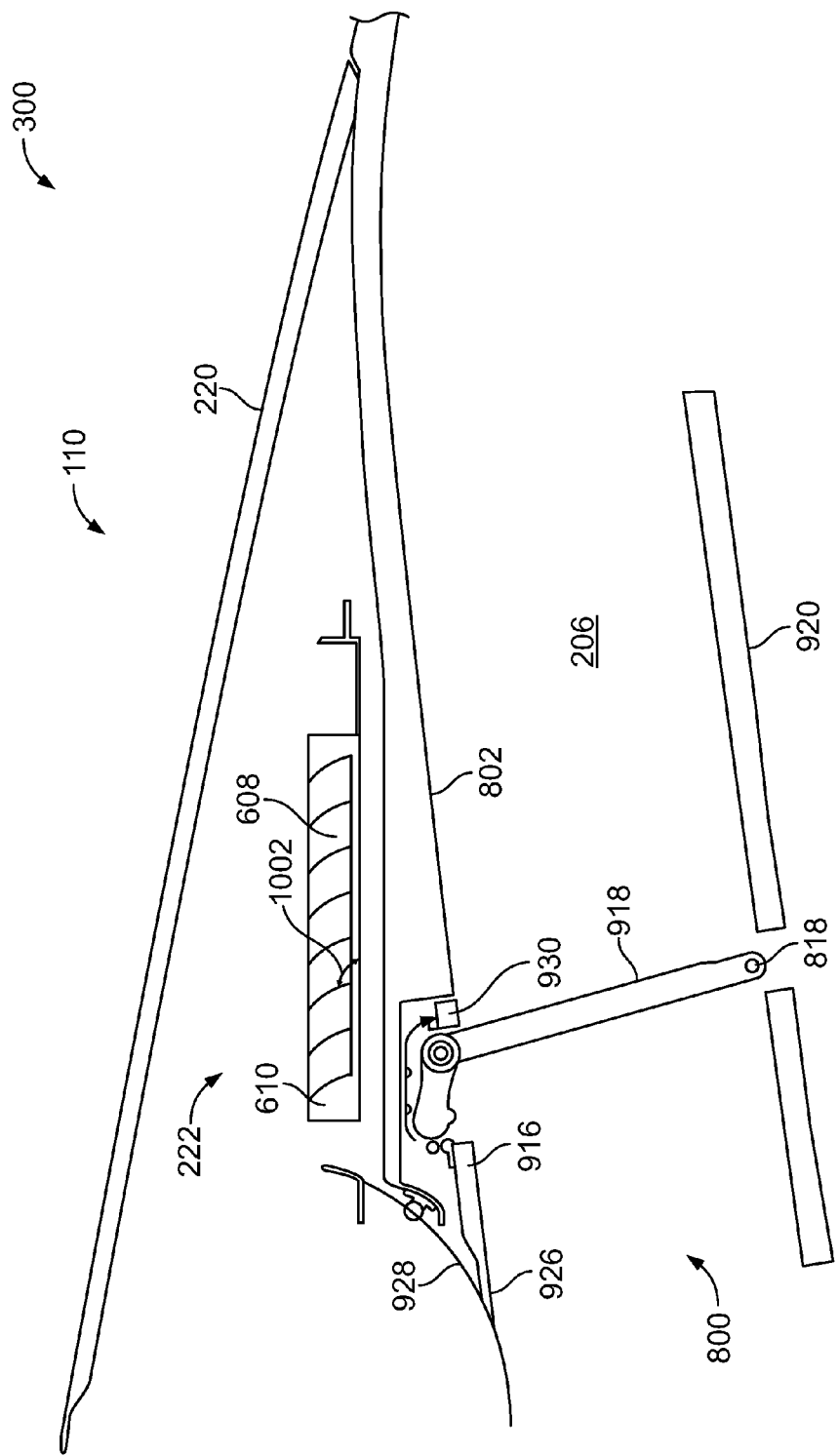
FIGS. 10-12 are cross-sectional, schematic illustrations of the example reverse thrust system of FIGS. 1-4 with the example drive system of FIGS. 8A, 8B and 9 in the non-deployed position, an intermediate position, and the deployed position, respectively.
Figure 11:
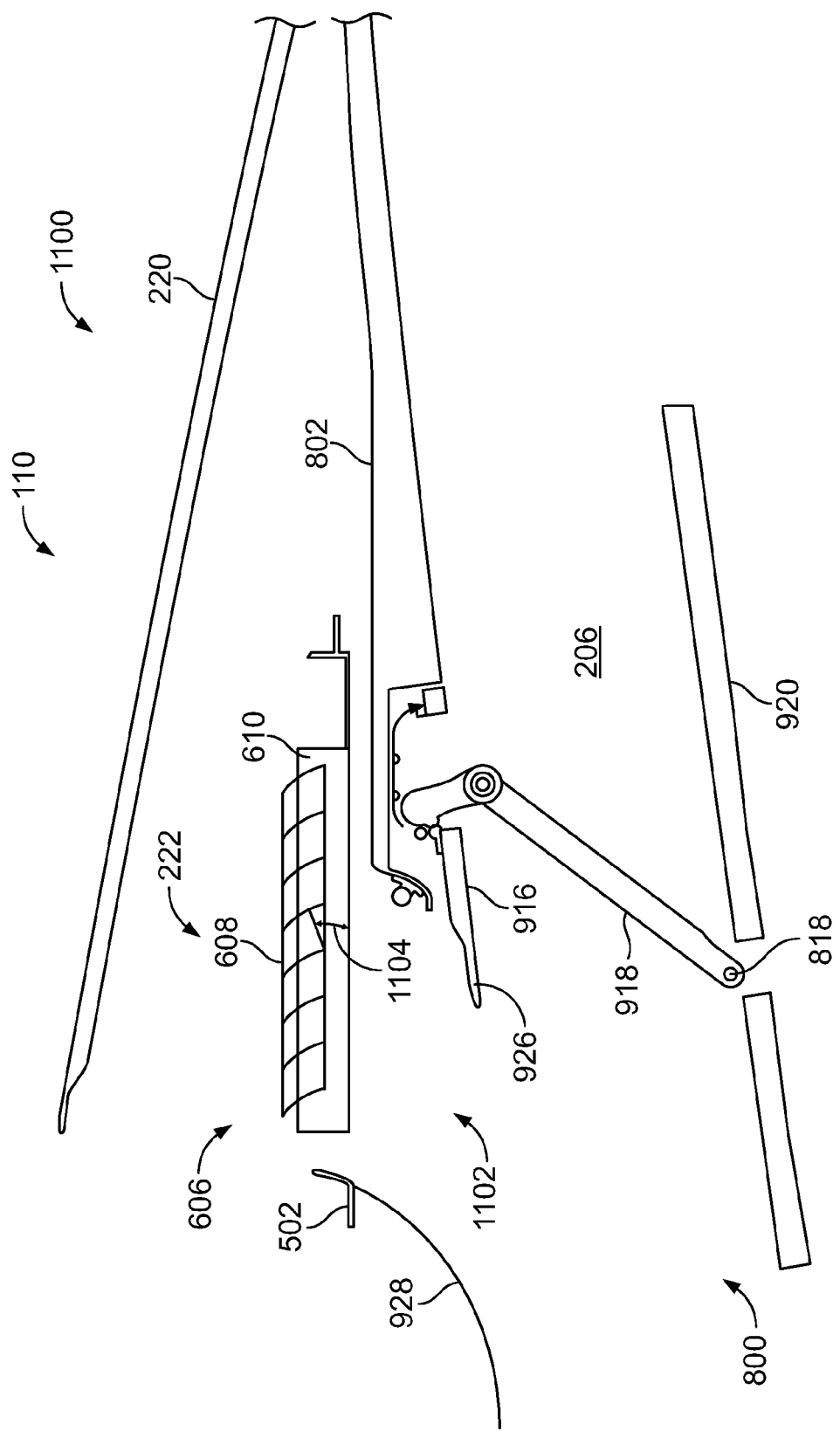
Figure 12:
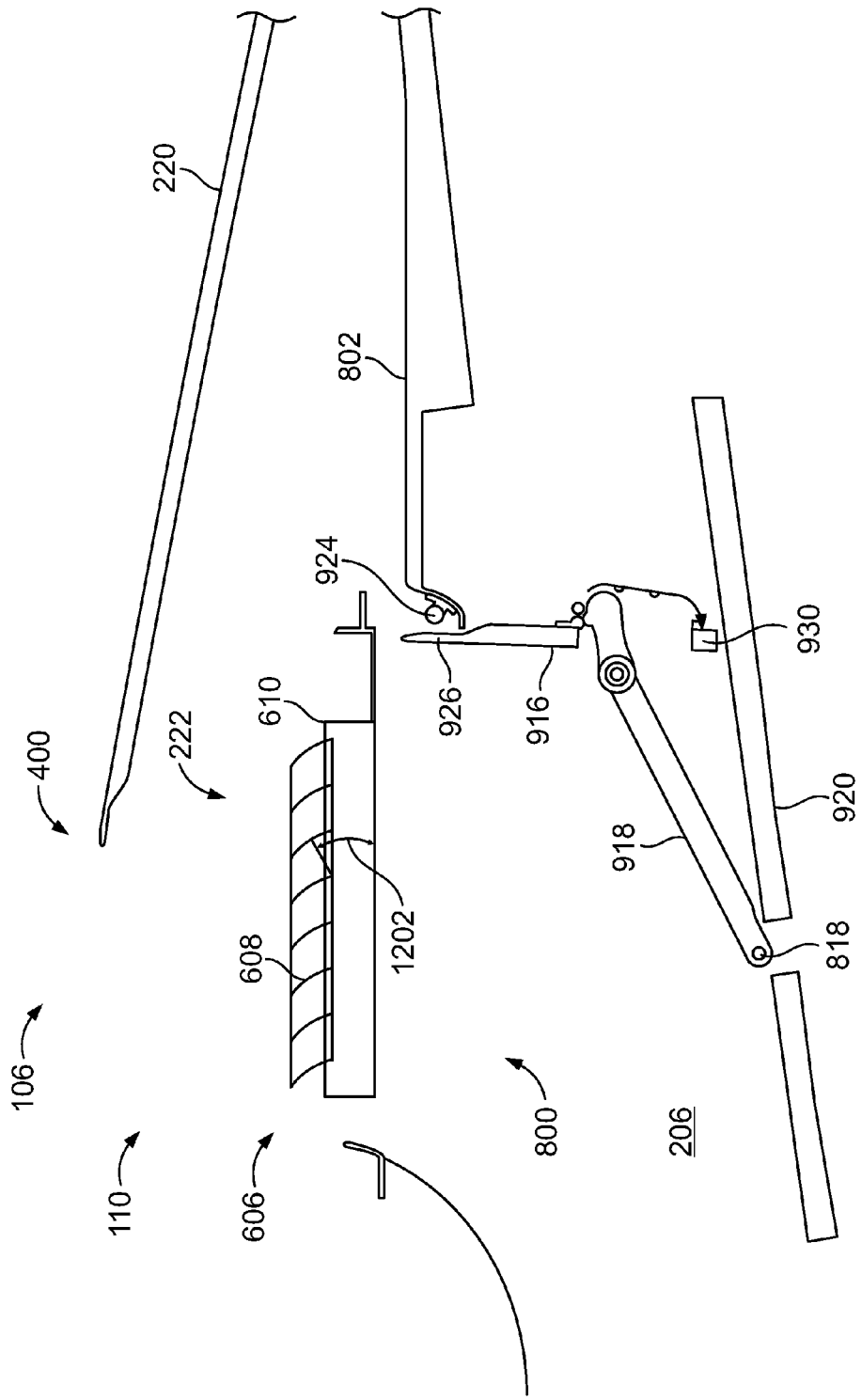

FIGS. 10-12 are cross-sectional, schematic illustrations of the example reverse thruster system 110 with the example drive system 800 of FIGS. 8A, 8B and 9 moving between the non-deployed position 300 and the deployed position 400. In particular, FIG. 10 illustrates the reverse thruster system 110 in the non-deployed position 300, FIG. 11 illustrates the reverse thruster system 110 in an intermediate position 1100, and FIG. 12 illustrates the reverse thruster system 110 in the deployed position 400.

When the reverse thruster system 110 is in the non-deployed position 300, as illustrated in FIG. 10, forward thrust (e.g., a maximum forward thrust) is produced by the aircraft engine 106 as the airflow 210 (FIG. 2) enters the bypass 206 via the air intake 212 (FIG. 2) and exits the bypass 206 via the aft end 218 (FIG. 2). In the non-deployed position 300, the first end 926 of the door 916 sealingly engages the bullnose 928 and the second end 930 of the door 916 sealingly engages the translating panel 802 to prevent air in the bypass 206 from exiting the aircraft engine 106 via the cascade system 222. Further, in the first position 602, the cascade 608 provides a first angle of attack 1002 relative to, for example, the cascade frame 610.

To cause the aircraft engine 106 to begin to produce reverse thrust, the reverse thruster system 110 transitions from the non-deployed position 300 (FIG. 10) to the intermediate position 1100 (FIG. 11). As the reverse thruster system 110 transitions from the non-deployed position 300, the translating panel 802 and the outer panel 220 slide in a direction toward the aft end 218 of the aircraft engine 106. In turn, the link 918 pivotally coupled to the fan duct cowl 920 rotates about the pivoting end 818 of the link 918 in a direction (e.g., a clockwise direction in the orientation of FIG. 11) toward the aft end 218 of the aircraft engine 106. As illustrated in FIG. 11, the translating panel 802 sliding towed the aft end 218 of the aircraft engine 106 causes the first end 926 of the door 916 to disengage from the bullnose 928. As a result, a flow path 1102 is created between the bullnose 928 and the door 916 that enables at least a portion air of the bypass 206 to flow toward and through the cascade system 222 (e.g., through the reverse thrust flow path 606).

Thus, in the intermediate position 1100, air within the bypass 206 begins to flow outwardly from the aircraft engine 106 through the cascade system 222. As a result, the reverse thruster system 110 provides a reverse thrust that helps reduce the net forward thrust (e.g., a net forward thrust less than a maximum forward thrust). For example, the profile and/or position of the cascade 608 and/or the cascade frame 610 of the illustrated example directs air to exit the bypass 206 in a direction that is circumferentially outward from the aircraft engine 106 and/or substantially toward the front end 404 of the aircraft engine 106. Thus, at least a portion of the airflow 210 (FIG. 2) that enters the bypass 206 via the air intake 212 (FIG. 2) that would otherwise create forward thrust exits the bypass 206 via the cascade system 222 to create reverse thrust, reduce forward thrust and/or reduce net thrust produced by the aircraft engine 106.

Further, because the rack 634 (FIGS. 6A and 6B) of each of the cascade assemblies 502 of the cascade system 222 are coupled to the translating panel 802, movement of the translating panel 802 causes the cascade 608 to move, slide and/or translate relative to the cascade frame 610. In the intermediate position 1100, the cascade 608 provides a second angle of attack 1104 relative to the cascade frame 610. In the illustrated example, the second angle of attack 1104 is different than (e.g., greater than) the first angle of attack 1002 of FIG. 10. In some such examples, the cascade 608 moves or rotates between about 2 and 10 degrees relative the cascade frame 610 as the reverse thruster system 110 transitions between the non-deployed position 300 and the intermediate position 1100. Although cascade 608 rotates (and translates) relative to the cascade frame 610 to vary the reverse thrust, the cascade 608 (e.g., the outer edges 650 and/or 660) remains substantially parallel relative to the cascade frame 610 (e.g., the outer edge 658 of the fixed structure 618 when the cascade 608 moves between the first and second positions 602 and 604. In the illustrated example, the cascade 608 is rotated about 8 degrees in a counterclockwise direction in the orientation of FIG. 11.

Rotation of the cascade 608 from the first position 602 toward the second position 604 of the cascade 608 (e.g., from the first position 602) increases an amount of reverse thrust produced by the aircraft engine 106 by directing airflow in a direction more toward the front end 404 of the aircraft engine 106 (e.g., in a direction opposite to airflow that produces forward thrust) than when the cascade 608 is in the first position 602 shown in FIG. 6A and/or FIG. 10.

FIG. 12 illustrates the reverse thruster system 110 in the deployed position 400 that produces a maximum amount of reverse thrust of the aircraft engine 106. To transition the reverse thruster system 110 to the deployed position 400, the drive system 800 causes the translating panel 802 to slide further in a direction toward the aft end 218 of the aircraft engine 106. In turn, the link 918 is further rotated about the pivoting end 818 in the first direction (e.g., a clockwise direction in the orientation of FIG. 12) toward the aft end 218 of the aircraft engine 106. In the illustrated example, movement of the translating panel 802 and rotation of the link 918 cause the door 916 to rotate in a clockwise direction about the end 924 of the translating panel 802. As illustrated in FIG. 12, the first end 926 of the door 916 engages the translating panel 802 and the second end 930 of the door 916 engages the fan duct cowl 920 to form a wall or obstruction that diverts or directs substantially some and/or all of the airflow in the bypass 206 toward the cascade system 222. Because the obstruction formed by the door 916 substantially prevents the air in the bypass 206 from flowing toward the aft end 218 of the aircraft engine 106, the reverse thruster system 110 significantly reduces the amount of forward thrust provided by the aircraft engine 106. Additionally, the air flowing through the cascade system 222 toward the front end 404 of the aircraft engine 106 significantly increases reverse thrust.

As illustrated in FIG. 12, the drive system 800 further causes the cascade 608 of the cascade system 222 to move, slide and/or translate relative to the cascade frame 610 to the second position 604. In particular, the cascade 608 moves further relative to the cascade frame 610 compared to the intermediate position 1100. In the deployed position 400, the cascade 608 provides a third angle of attack 1202 relative to the cascade frame 610. In the illustrated example, the third angle of attack 1202 is different than (e.g., greater than) the second angle of attack 1104 of FIG. 11 and the first angle of attack 1002 of FIG. 10. In some such examples, the cascade 608 moves between about 10 and 20 degrees relative to a position of the cascade 608 in the first position 602 and/or the intermediate position 1100 and/or the frame 610. In the illustrated example, the cascade 608 is rotated about 15 degrees in a counterclockwise direction in the orientation of FIG. 12. As a result of the reverse thrust flow path 606 directing airflow in a direction more toward the front end 404 of the aircraft engine 106 (e.g., in a direction opposite to airflow that produces forward thrust), an amount of reverse thrust produced by the aircraft engine 106 is further increased and, thus, an amount of forward and/or net thrust is further reduced than, for example, when the reverse thruster system 110 is in the non-deployed position 300 and/or the intermediate position 1100.

Accordingly, the reverse thruster system 110 enables the example aircraft engine 106 to produce a substantially reduced net thrust. During landing, for example, the example reverse thruster system 110 helps bring the example aircraft 100 to a gradual stop (e.g., to have a velocity of zero) with reduce use of a braking system. For example, immediately prior to (e.g., when the aircraft 100 is 5-20 feet above ground as the aircraft 100 descends) and/or immediately after the aircraft 100 touches ground, the reverse thruster system 110 may be transitioned to the deployed position 400 to quickly decelerate the aircraft 100. As the aircraft 100 decelerates upon landing, the reverse thruster system 110 gradually transitions toward the non-deployed position 400 to gradually reduce an amount of reverse thrust produced to enable the aircraft 100 to be brought to a controlled halt.

Further, in some examples, the reverse thruster system 110 enables the aircraft engine 106 to produce a negative net thrust (a force toward the aft end 218 that is greater than a force toward the front end 404). In such examples, a reverse net thrust produced by the reverse thruster system 110 exceeds a forward thrust produced by the engine core 204 and/or the bypass 206. Thus, the reverse thruster system 110 may be employed to slowly move the aircraft 100 in a rearward or reverse direction. As a result, the aircraft 100 may navigate or move away from an apron and/or tarmac without relying on a tow tractor to push or pull the aircraft 100 in the rearward direction.

In some examples, the drive systems 630, 702, 800 and/or the cascade 608 of the cascade assemblies 502 are actuated manually via a switch accessible via a cockpit. In some examples, the drive systems 630, 702, 800 and/or the cascade 608 of the cascade assemblies 502 are operated via a control system.

Figure 13:
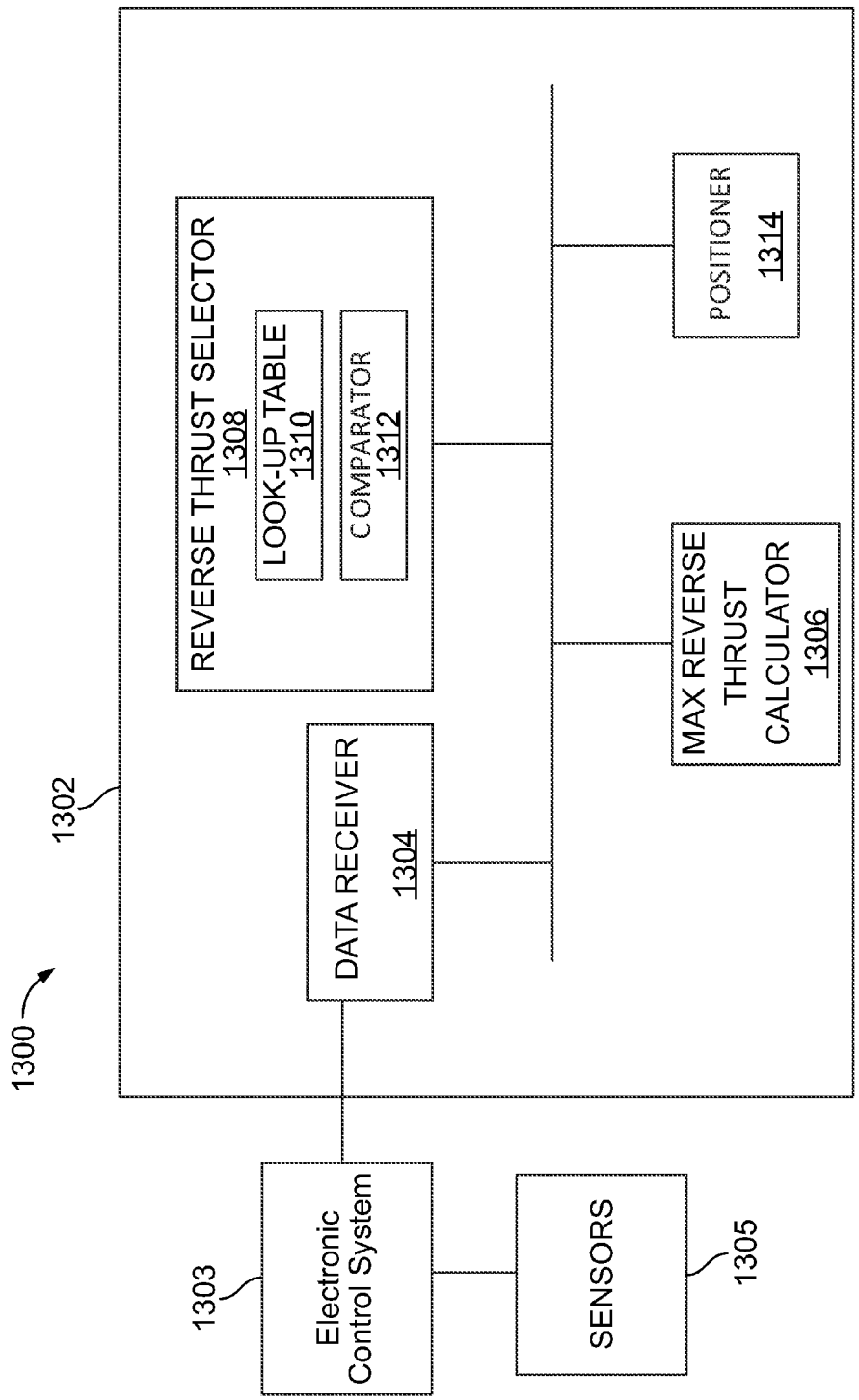
FIG. 13 is a block diagram of an example reverse thruster system constructed in accordance with the teachings disclosed herein.

FIG. 13 illustrates a block diagram of an example system 1300 that may be employed to operate and/or control the reverse thruster system 110 of the example aircraft 100. For example, the example system 1300 may be employed to operate the drive system 630 of FIGS. 6A and 6B, the drive system 702 of FIG. 7 and/or the drive system 800 of FIGS. 8A, 8B and 9-12. The system 1300 can be, for example, implemented as part of software and/or an application associated with the aircraft 100. In some examples, the features and functionality of the system 1300 are implemented in hardware operable in connection with the aircraft 100.

The example system 1300 of FIG. 13 includes a reverse thrust controller 1302. As illustrated in FIG. 13, the controller 1302 includes a data receiver 1304 to receive data of real-time flight characteristics that affect reverse thrust to be produced by an engine (e.g., the aircraft engine 106 of FIG. 1) of the aircraft 100 upon landing. For example, the current speed of the aircraft 100, cross-wind characteristics, temperature, altitude, net thrust of the aircraft engine 106, airflow intake of the aircraft engine 106 and/or airflow exhaust of the aircraft engine 106 may affect the reverse thrust that is to be produced during the landing process. The data receiver 1304 receives data from a main controller 1303 and/or sensors 1305. For example, the data receiver 1304 of the illustrated example may be configured to receive data from the main controller 1303 representative of real-time flight characteristic(s). The flight characteristic(s) received by the data receiver 1304 may include data representative of an airflow intake and airflow exhaust of the aircraft engine 106.

A max reverse thrust calculator 1306 of the controller 1302 calculates a maximum reverse thrust that the aircraft engine 106 can produce based on data such as, for example, current flight conditions and/or flight characteristic(s) received by the data receiver 1304. In some examples, when calculating the maximum reverse thrust based on the flight conditions and/or characteristic(s), the max reverse thrust calculator 1306 may account for characteristics of the aircraft engine 106 such as, for example, dimensions of a bypass (e.g., the bypass 206 of FIG. 2), dimensions of a reverse thrust pathway (e.g., the flow path 606, the reverse thrust pathway), a shape, a profile and/or an orientation of cascade vanes (e.g., the first vanes 612 and/or the second vanes 614 of the cascade 608) and/or maximum rotation of the cascade 608 between a first position (e.g., the first position 602 of FIG. 6A) and a second position (e.g., the second position 604 of FIG. 6B) and/or an angle of attack (e.g., the angle of attack 1002, 1104 and/or 1202) provided by the cascade system 222. In other words, the max reverse thrust calculator 1306 calculates the maximum reverse thrust that the aircraft engine 106 is capable of producing under present flight conditions.

The controller 1302 of the example system 1300 includes a reverse thrust selector 1308 to select and/or determine a target reverse thrust that the aircraft engine 106 is to produce based on the received data (e.g., flight conditions and/or characteristics). When selecting the target reverse thrust, in some examples, the reverse thrust selector 1308 identifies a current net thrust of the aircraft engine 106, a target net thrust of the aircraft engine 106 based on the received data (e.g., current flight conditions and/or characteristics), and a maximum reverse thrust calculated by the max reverse thrust calculator 1306. The reverse thrust selector 1308 identifies the target net thrust by considering, for example, real-time characteristics of the aircraft 100 within a landing sequence (e.g., current speed of the aircraft 100, duration of time after the aircraft 100 has touched down, distance the aircraft 100 has traveled on ground upon landing, etc.) and other (e.g., real-time) characteristics (e.g., cross-wind, temperature, altitude, etc.) obtained via the data receiver 1304. A look-up table 1310 of the reverse thrust selector 1308 provides the target net thrust based on the received data. After the target reverse thrust is identified, a comparator 1312 of the reverse thrust selector 1308 compares the calculated net thrust and the target net thrust. In some examples, because the aircraft engine 106 cannot produce reverse thrust that exceeds the maximum reverse thrust calculated by the max reverse thrust calculator 1306, the comparator 1312 compares the selected target reverse thrust to the calculated maximum reverse thrust to ensure that the system 1300 does not attempt to produce a reverse thrust that exceeds the maximum reverse thrust. When the target reverse thrust is less than or equal to the calculated maximum reverse thrust, the reverse thrust selector 1308 assigns the target reverse thrust as the amount of thrust to be produced. When the target reverse thrust is greater than the calculated maximum reverse thrust, the reverse thrust selector 1308 assigns the calculated maximum reverse thrust as the target reverse thrust as the amount of thrust to be produced.

A positioner 1314 of the example system 1300 positions the reverse thruster system 110 based on the target reverse thrust selected by the reverse thrust selector 1308. To produce the reverse thrust selected by the reverse thrust selector 1308, the positioner 1314 may position the reverse thruster system 110 between the non-deployed position 300, the deployed position 400, and/or any other position between the non-deployed position 300 and the deployed position 400 (e.g., the intermediate position 1100 of FIG. 11) via, for example, the example drive systems 630, 702 and/or 800 disclosed herein. In some examples, the positioner 1314 controls the position of the cascade 608 of the cascade assemblies 502 between the first and second positions 602 and 604 via, for example, the example drive systems 630, 702 and/or 800. The positioner 1314 continues to adjust the cascade assemblies 502 of the reverse thruster system 110 until the selected net thrust is achieved.

While an example manner of implementing the example reverse thruster system 110 of FIGS. 1-12 is illustrated in FIG. 13, one or more of the elements, processes and/or devices illustrated in FIG. 13 may be combined, divided, re-arranged, omitted, eliminated and/or implemented in any other way. Further, the example reverse thrust controller 1302, the example data receiver 1304, the example reverse thrust selector 1308, the example look-up table 1310, the example comparator 1312, the example positioner 1314 and/or, more generally, the example system 1300 of FIG. 13 may be implemented by hardware, software, firmware and/or any combination of hardware, software and/or firmware. Thus, for example, any of the example thrust controller 1302, the example data receiver 1304, the example reverse thrust selector 1308, the example look-up table 1310, the example comparator 1312, the example positioner 1314 and/or, more generally, the example system 1300 of FIG. 13 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example reverse thrust controller 1302, the example data receiver 1304, the example reverse thrust selector 1308, the example look-up table 1310, the example comparator 1312, the example positioner 1314 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 1300 of FIG. 13 may include one or more elements, processes and/or devices in addition to, or instead of, those illustrated in FIG. 13, and/or may include more than one of any or all of the illustrated elements, processes and devices.

Figure 14:
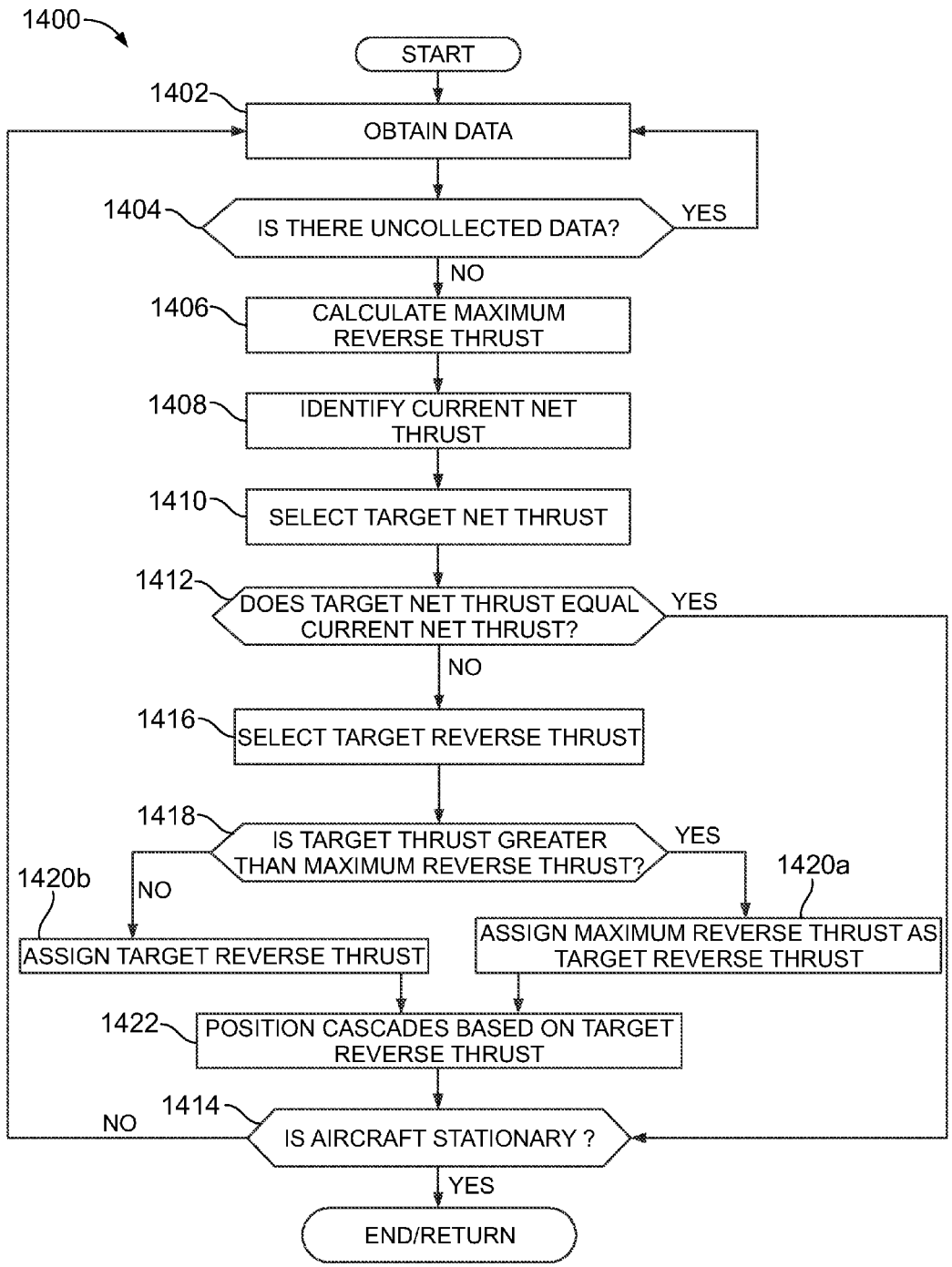
FIG. 14 is a flowchart representative of an example method that may be used to implement the example reverse thruster system of FIG. 13.

FIG. 14 is a flowchart representative of an example method 1400 for implementing the example system 1300 employed to operate the reverse thruster system 110. In the illustrated example, the method 1400 may be implemented using machine readable instructions that comprise a program for execution by a processor such as the processor 1512 shown in the example processor platform 1500 discussed below in connection with FIG. 15. The program may be embodied in software stored on a tangible computer readable storage medium such as a CD-ROM, a floppy disk, a hard drive, a digital versatile disk (DVD), a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowchart illustrated in FIG. 14, many other methods for implementing the example reverse thrust system 1300 may be used. For example, the order of execution of the blocks may be changed, and/or some of the blocks described may be changed, eliminated, or combined.

The example method 1400 of FIG. 14 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example method 1400 of FIG. 14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The example method 1400 disclosed herein begins with the data receiver 1304 receiving data (e.g., real-time flight characteristic data) that may affect reverse thrust to be produced by the aircraft engine 106 upon the aircraft 100 landing (block 1402). For example, the data receiver 1304 collects data from the sensor 1305 and/or an electronic control system 1303 of the aircraft 100 (e.g., aircraft speed, altitude, air temperature, cross-wind conditions, net thrust of the aircraft engine 106, airflow intake of the aircraft engine 106 and/or airflow exhaust of the aircraft engine 106, etc.). After the data receiver 1304 receives the data at block 1402, the data receiver 1304 identifies whether there is additional data (e.g., real-time flight characteristic data) that has yet to be collected by the data receiver 1304 (block 1404). If there is uncollected data, control returns to block 1402.

If all necessary data is collected at block 1404, the max reverse thrust calculator 1306 calculates a maximum reverse thrust of the aircraft engine 106 based on the collected data (block 1406). In some examples, the max reverse thrust calculator 1306 calculates the maximum reverse thrust based on a position of the cascade 608 of the cascade system 222 being in the first position 602, the second position 604 and/or any other position.

Further, after the data is collected at block 1404, a current net thrust is identified (block 1408). In some examples, the data receiver 1304 collects a current forward thrust and a current reverse thrust, and the reverse thrust selector 1308 subsequently determines the current net thrust based on or comparing the current forward thrust and the current reverse thrust.

In addition, after the data is collected at block 1404, a target net thrust is determined (block 1410). For example, the reverse thrust selector 1308 determines and/or selects a target net thrust that the aircraft engine 106 is to produce during a landing sequence. To select the target net thrust that the aircraft engine 106 is to produce, the reverse thrust selector 1308 identifies a status of the aircraft 100 within the landing sequence based on the current speed of the aircraft 100, the duration of time after the aircraft 100 touched down and/or the distance the aircraft 100 has traveled on ground upon landing. Using the collected real-time flight characteristics data, the look-up table 1310 of the reverse thrust selector 1308 selects the target reverse thrust that is to be produced by the aircraft engine 106. For example, if the aircraft 100 has just landed and is traveling at a high velocity, the target net thrust selected may be relatively high. If the aircraft 100 is nearing a stationary position (e.g., zero velocity), the target net thrust selected may be relatively low.

After the current net thrust is identified and the target net thrust is determined, the comparator 1312 of the reverse thrust selector 1308 determines whether the target net thrust substantially or approximately equals the current net thrust (block 1412). If the target net thrust substantially or approximately equals (e.g., the target net thrust is within between approximately 0.1 and 10 percent of) the current net thrust, the comparator 1312 of the reverse thrust selector 1308 determines whether the aircraft 100 is stationary (e.g., zero velocity) (block 1414). If the revere thrust selector 1308 determines that the aircraft 100 is stationary at block 1414, the method 1400 ends. If the reverse thrust selector 1308 determines that the aircraft 100 is not stationary at block 1414, the method 1400 returns to block 1402.

If the comparator 1312 of the reverse thrust selector 1308 determines that the target net thrust does not equal the current net thrust at block 1412, the reverse thrust selector 1308 selects the target net thrust (block 1416). Once the target reverse thrust is selected at block 1416, the comparator 1312 determines whether the target reverse thrust selected is greater than the maximum reverse thrust (block 1418). If the target reverse thrust is greater than the maximum reverse thrust at block 1418, the reverse thrust selector 1308 assigns the maximum reverse as the target reverse thrust (block 1420*a*). If the target reverse thrust is less than or equal the maximum reverse thrust at block 1418, the target reverse thrust is selected (1420*b*).

Once the target reverse thrust is determined, the positioner 1314 adjusts the position of the cascade 608 of the cascade system 222 to produce the target reverse thrust (block 1422). For example, the positioner 1314 utilizes the drive system 630 to position the cascade 608 at the first position 602, the second position 604, and/or any other position between the first position 602 and the second position 604. In some examples, the positioner 1314 positions the reverse thruster system 110 between the non-deployed position 300, the deployed position 400, and/or any other position between the non-deployed position 300 and the deployed position 400 (e.g., the intermediate position 1100 of FIG. 11) via, for example, the example drive systems 630, 702 and/or 800. After the position of the cascade 608 is adjusted, the comparator 1312 of the reverse thrust selector 1308 determines whether the aircraft 100 is stationary (block 1414). If the reverse thrust selector 1308 determines that the aircraft is not stationary at block 1414, the method returns to block 1402. If the reverse thrust selector 1308 determines that the aircraft is stationary at block 1414, the method 1400 ends.

Figure 15:
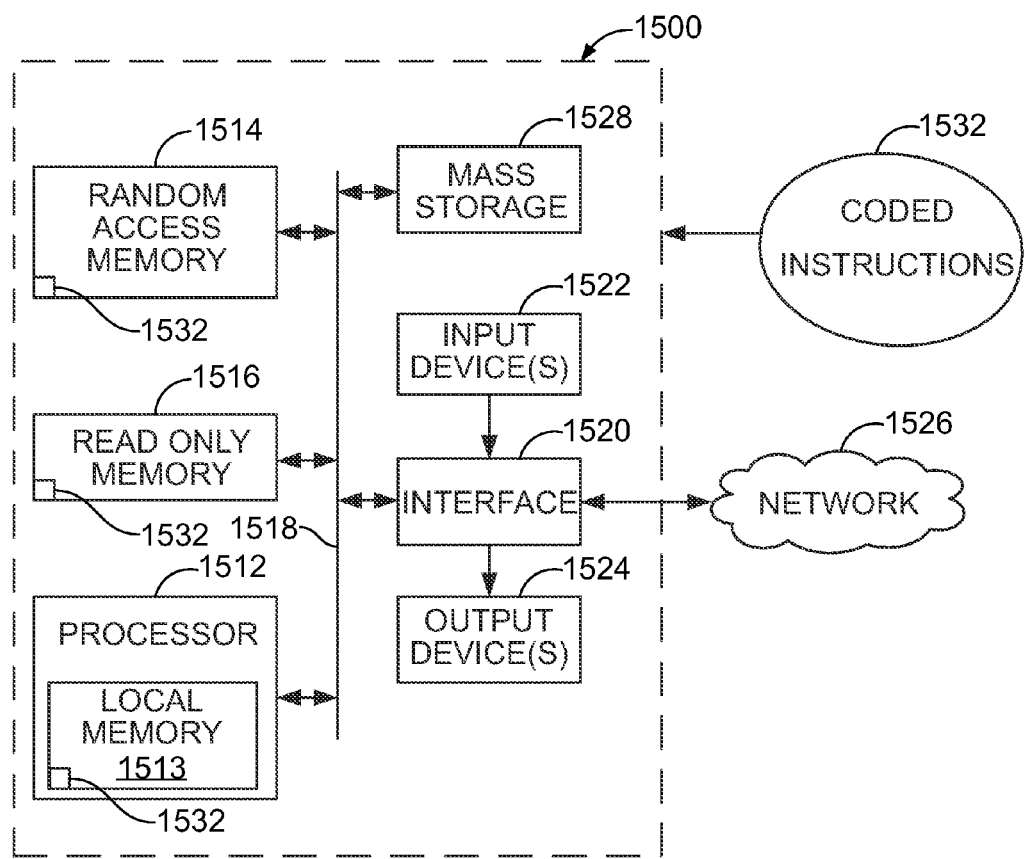
FIG. 15 is a block diagram of an example processor platform capable of executing instructions to perform the methods of FIG. 14 to implement the example reverse thrust controller system of FIG. 13.

FIG. 15 is a block diagram of an example processor platform 1500 capable of performing the example method 1400 of FIG. 14 to implement the example reverse thrust controller system 1300 of FIG. 13. The processor platform 1500 can be, for example, a server, a flight control computer, a mobile device (e.g., a cell phone, a smart phone, a tablet such as an iPad™), or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a cockpit instrument (e.g., a gauge and/or indicator) a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

Coded instructions 1532 to implement the method 1400 of FIG. 14 may be stored in the mass storage device 1528, in the volatile memory 1514, in the non-volatile memory 1516, and/or on a removable tangible computer readable storage medium such as a CD or DVD.

Although certain example apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. A cascade apparatus for use with a turbofan engine comprising:
    a cascade frame having a first end, a second end, and a fixed structure extending between the first end and second end, the cascade frame defining a slot; and
    a cascade to form a reverse thrust flow path, at least a portion of the cascade being slidably coupled to the frame via the slot, the cascade to slide relative to the frame between a first position to produce a first reverse thrust and a second position to produce a second reverse thrust, the first reverse thrust being different than the second reverse thrust, the cascade including a first plurality of vanes that intersect a second plurality of vanes to define the reverse thrust flow path, the first vanes being fixed and perpendicular relative to the second vanes.

2. The apparatus of claim 1, wherein at least one of the first vanes or the second vanes slidably coupled to the slot of the cascade frame.

3. The apparatus of claim 1, further comprising a rack-and-pinion assembly coupled to the cascade via a link, the rack-and-pinion assembly to cause the cascade to slide relative to the frame.

4. The apparatus of claim 3, wherein a first end of the link is coupled to the cascade and a second end of the link is coupled to a pinion of the rack-and-pinion assembly.

5. The apparatus of claim 3, further comprising an actuator to cause a rack of the rack-and-pinion assembly to slide, wherein a first position of the rack is associated with the first position of the cascade and a second position of the rack is associated with the second position of the cascade.

6. The apparatus of claim 1, wherein the cascade is to shift relative to the frame in an outward direction when the cascade moves between the first position and the second position.

7. The apparatus of claim 6, wherein the cascade is to shift away from the frame when the cascade moves toward the second position and the cascade is to shift toward the frame when the cascade moves toward the first position.

8. The apparatus of claim 6, wherein an outer edge of the cascade is at a first distance from an outer edge of the fixed structure when the cascade is in the first position and the outer edge of the cascade is at a second distance from the outer edge of the fixed structure when the cascade is in the second position, the second distance being greater than the first distance.

9. A cascade apparatus for use with a turbofan engine comprising:
    a cascade frame having a first end, a second end, and a fixed structure extending between the first end and second end, the cascade frame defining a slot; and
    a cascade to form a reverse thrust flow path, at least a portion of the cascade being slidably coupled to the frame via the slot, the cascade to slide relative to the frame between a first position to produce a first reverse thrust and a second position to produce a second reverse thrust, the first reverse thrust being different than the second reverse thrust, wherein the cascade is to shift relative to the cascade frame in an outward direction when the cascade moves between the first position and the second position, wherein an outer edge of the cascade and an outer edge of the fixed structure are flush when the cascade is in the first position, and wherein the outer edge of the cascade is spaced away from the outer edge of the fixed structure when the cascade is in the second position.

10. The apparatus of claim 1, wherein the cascade varies a reverse thrust provided by the reverse thrust flow path that is proportional to a position of the cascade relative to the fixed structure.

11. The apparatus of claim 1, wherein in the second position, the cascade provides an angle of attack that enables an aircraft to move in a rearward direction from an initially stationary position.

12. The apparatus of claim 9, wherein the cascade is to shift away from the frame when the cascade moves toward the second position and the cascade is to shift toward the frame when the cascade moves toward the first position.

13. The apparatus of claim 9, wherein the outer edge of the cascade is at a first distance from the outer edge of the fixed structure when the cascade is in the first position and the outer edge of the cascade is at a second distance from the outer edge of the fixed structure when the cascade is in the second position, the second distance being greater than the first distance.

14. A method to control reverse thrust of an aircraft engine comprising:
varying a position of a cascade relative to a position of a frame by sliding the cascade relative to the frame to vary a reverse thrust provided by a reverse thrust flow path defined by the cascade, the reverse thrust being proportional to a position of the cascade relative to the frame, the cascade including the first vanes and second vanes, the first vanes being fixed to and intersecting second vanes such that the first vanes and the second vanes define a plurality of openings formed in a grid pattern.

15. The method of claim 14, wherein varying the position of the cascade relative to the frame comprises sliding the cascade relative to the frame along a path defined by a slot of the frame.

16. The method of claim 14, further comprising moving the cascade to a first position relative to the frame to provide a first reverse thrust and moving the cascade to a second position relative to the frame to provide a second reverse thrust, the second reverse thrust being greater than the first reverse thrust.

17. The method of claim 16, further comprising moving the cascade to an intermediate position between the first position and the second position to provide an intermediate reverse thrust, the intermediate reverse thrust being greater than the first reverse and less than the second reverse thrust provided by the cascade in the second position.

18. The method of claim 16, further comprising actuating a rack-and-pinion assembly to move the cascade relative to the frame between the first and second positions, the cascade being operatively coupled to the rack-and-pinion assembly via a link.

19. The method of claim 14, further comprising operatively coupling the cascade to a drive system of a reverse thrust blocker door such that operation of the reverse thrust blocker door between a first position and a second position causes the cascade to slide relative to the frame between the first and second positions.

20. A cascade apparatus for use with a turbofan comprising:
means for providing reverse thrust, the means for providing reverse thrust including first means for directing fluid flow and second means for directing fluid flow, the first means for directing fluid flow being fixed to and intersecting the second means for directing fluid flow such that the first means for directing fluid flow is non-parallel relative to the second means for directing fluid flow; and
means for supporting the means for providing reverse thrust, the means for supporting having means for slidably receiving the means for providing reverse thrust to enable the first means for directing fluid flow and the second means for directing fluid flow to move relative to the means for supporting between a first position and a second position, the means for providing reverse thrust to provide a first reverse thrust in the first position and second reverse thrust in the second position, the first reverse thrust being different than the second reverse thrust.

21. The apparatus of claim 20, further comprising means for actuating operatively coupled to the means for providing reverse thrust to move the means for providing reverse thrust between the first and second positions relative to the means for supporting.

22. The apparatus of claim 20, wherein the first means for directing fluid flow is fixed to the second means for directing fluid flow.

* * * * *

UNITED STATES PATENT AND TRADEMARK OFFICE
CERTIFICATE OF CORRECTION

PATENT NO. : 10,018,151 B2  
APPLICATION NO. : 14/596969  
DATED : July 10, 2018  
INVENTOR(S) : Nakhjavani et al.

Page 1 of 1

It is certified that error appears in the above-identified patent and that said Letters Patent is hereby corrected as shown below:

In the Claims

Column 23, Line 19 (Claim 14): Delete "the" between "including" and "first vanes".

Signed and Sealed this  
Thirteenth Day of November, 2018

Andrei Iancu  
*Director of the United States Patent and Trademark Office*